US012578413B2

(12) United States Patent
Yang et al.

(10) Patent No.: US 12,578,413 B2
(45) Date of Patent: Mar. 17, 2026

(54) METHOD FOR POSITIONING USING WIRELESS COMMUNICATION AND ELECTRONIC DEVICE FOR SUPPORTING SAME

(71) Applicant: SAMSUNG ELECTRONICS CO., LTD., Suwon-si (KR)

(72) Inventors: Yi Yang, Suwon-si (KR); Moonseok Kang, Suwon-si (KR); Chiho Kim, Suwon-si (KR); Hyunchul Kim, Suwon-si (KR); Sungjun Lim, Suwon-si (KR); Jonghoon Jang, Suwon-si (KR); Moongee Cho, Suwon-si (KR); Kunyoung Choi, Suwon-si (KR); Woosup Lee, Suwon-si (KR); Sukgi Hong, Suwon-si (KR); Youngsuk Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 467 days.

(21) Appl. No.: 18/105,462

(22) Filed: Feb. 3, 2023

(65) Prior Publication Data

US 2023/0184868 A1 Jun. 15, 2023

Related U.S. Application Data

(63) Continuation of application No. PCT/KR2021/010005, filed on Jul. 30, 2021.

(30) Foreign Application Priority Data

Aug. 3, 2020 (KR) ......................... 10-2020-0097061

(51) Int. Cl.
*G01S 3/48* (2006.01)
*G01S 5/10* (2006.01)

(52) U.S. Cl.
CPC . *G01S 3/48* (2013.01); *G01S 5/10* (2013.01)

(58) Field of Classification Search
CPC ... G01S 3/48; G01S 5/10; G01S 5/021; G01S 5/0242; G01S 5/0009; G01S 5/0205
See application file for complete search history.

(56) References Cited

U.S. PATENT DOCUMENTS 8,576,122 B2 11/2013 Choi
10,094,902 B2 10/2018 Marquez et al.
(Continued)

FOREIGN PATENT DOCUMENTS

JP 7-84032 3/1995
JP 2004-012362 1/2004
(Continued)

OTHER PUBLICATIONS

Korean Office Action dated Aug. 20, 2025 for KR Application No. 10-2020-0097061.

*Primary Examiner* — Wesley L Kim
*Assistant Examiner* — Erkin Abdullaev
(74) *Attorney, Agent, or Firm* — Nixon & Vanderhye P.C.

(57) ABSTRACT

An electronic device may include: a communication module that supports ultra-wideband communication; a memory that stores correction values respectively corresponding to a plurality of data ranges divided according to a specified condition, in relation to data for positioning of an external electronic device; a processor operatively connected to the communication module and the memory; and a location determination module operatively connected to the processor. The location determination module may be configured to: acquire a phase difference of arrival of a signal calculated on the basis of the signal received from the external electronic device via the communication module; determine a data range corresponding to the acquired phase difference of arrival of the signal from among the plurality of data ranges;

(Continued)

and calculate the angle of arrival of the signal by using a correction value corresponding to the determined data range from among the correction values. Various other embodiments are possible.

19 Claims, 14 Drawing Sheets

(56) References Cited

U.S. PATENT DOCUMENTS

| | | | |
|---|---|---|---|
| 10,921,438 B2 | 2/2021 | Jeon et al. | |
| 11,095,017 B2 | 8/2021 | Cooper et al. | |
| 2011/0260911 A1 | 10/2011 | Sapp | |
| 2017/0117946 A1 | 4/2017 | Lee et al. | |
| 2017/0242092 A1* | 8/2017 | Marquez | G01S 3/46 |
| 2018/0287568 A1* | 10/2018 | Malik | H04L 25/0222 |

| | | | |
|---|---|---|---|
| 2018/0372832 A1 | 12/2018 | Ko et al. | |
| 2019/0064312 A1* | 2/2019 | Jeon | G01S 5/02521 |
| 2019/0072661 A1* | 3/2019 | Jeon | G01S 5/04 |
| 2019/0146052 A1 | 5/2019 | Chiu et al. | |
| 2019/0317177 A1* | 10/2019 | Ertan | G01S 13/42 |
| 2020/0011956 A1 | 1/2020 | Zarubica et al. | |
| 2020/0021011 A1 | 1/2020 | Cooper et al. | |
| 2020/0029165 A1* | 1/2020 | Kumar | G01S 5/10 |
| 2020/0081114 A1 | 3/2020 | Bialer et al. | |
| 2020/0358204 A1* | 11/2020 | Dotlic | H01Q 9/0464 |
| 2021/0373112 A1* | 12/2021 | Tertinek | G01S 3/10 |

FOREIGN PATENT DOCUMENTS

| | | |
|---|---|---|
| JP | 2007-017271 | 1/2007 |
| KR | 10-2016-0134436 | 11/2016 |
| KR | 10-2017-0073162 | 6/2017 |
| KR | 20170105827 A | 9/2017 |

* cited by examiner

1

METHOD FOR POSITIONING USING WIRELESS COMMUNICATION AND ELECTRONIC DEVICE FOR SUPPORTING SAME

CROSS-REFERENCE TO RELATED APPLICATIONS

This application is a continuation of International Application No. PCT/KR2021/010005, designating the United States, filed on Jul. 30, 2021, in the Korean Intellectual Property Receiving Office, and claiming priority to Korean Patent Application No. 10-2020-0097061 filed on Aug. 3, 2020, in the Korean Intellectual Property Office, the disclosures of all of which are hereby incorporated by reference herein in their entireties.

BACKGROUND

Field

Various example embodiments relate to a technology for positioning using wireless communication.

Description of Related Art

Recently, with the rapid development of wireless communication systems, the demand for services using wireless communication is increasing and the spread of electronic devices including wireless communication modules is also increasing. An electronic device supporting ultra-wideband (UWB) communication from among various wireless communication schemes can provide a precise positioning function. For example, the electronic device can measure the location of an external electronic device through a ranging operation that uses UWB communication and, based on the measured location of the external electronic device, the electronic device can control a function of the external electronic device or provide a location-based service specified to the external electronic device.

In a positioning process for an external electronic device, the electronic device can use the angle of arrival (AoA) of a signal received from the external electronic device. Here, the angle of arrival of the signal can be calculated using a distance between two or more antennas receiving the signal and a phase difference of arrival (PDoA) of the signal received at each of the antennas.

Meanwhile, at positioning using AoA, an error can exist in an AoA calculation value due to signal interference dependent on a distance between antennas, process deviation, or measurement error dependent on an angle between the antennas and the external electronic device. Accordingly, in a processing process of the electronic device, a procedure for calibrating the above-described error can be performed. For example, a correction value can be calculated such that the AoA calculation value in a reference angle range (e.g., −20 degrees to 20 degrees) with respect to the angle between the antennas and the external electronic device is within a specified error and/or satisfies a specified accuracy, and the calculated correction value can be applied to the AoA calculation value in all angle ranges.

In the existing AoA calibration procedure, when using a correction value calculated based on an AoA calculation value in some angle ranges with respect to an angle between antennas and an external electronic device, it can be difficult to acquire an AoA calculation value within a specified error and/or with a specified accuracy in some other angle ranges.

SUMMARY

Various example embodiments may provide a method for positioning using wireless communication and an electronic device supporting the same, for calculating AoA within a specified error and/or with a specified accuracy by applying different correction values respectively corresponding to a plurality of angle ranges divided according to a specified condition with respect to an angle between antennas and an external electronic device.

An example electronic device of various example embodiments may include a communication module, comprising communication circuitry, that supports ultra-wideband communication, a memory that stores correction values respectively corresponding to a plurality of data ranges divided according to a specified condition, in relation to data for positioning of an external electronic device, a processor, comprising processing circuitry, operatively connected to the communication module and the memory, and a location determination module operatively connected to the processor. The location determination module, comprising processing circuitry, may be configured to acquire a phase difference of arrival of a signal calculated based on the signal received from the external electronic device via the communication module, determine a data range corresponding to the acquired phase difference of arrival of the signal from among the plurality of data ranges, and calculate the angle of arrival of the signal by using a correction value corresponding to the determined data range from among the correction values.

An example method for positioning using wireless communication of an electronic device of various example embodiments may include the operation of acquiring a phase difference of arrival of a signal calculated based on the signal received from an external electronic device via a communication module of the electronic device, the operation of determining a data range corresponding to the acquired phase difference of arrival of the signal from among a plurality of data ranges divided according to a specified condition, in relation to data for positioning of the external electronic device, and the operation of calculating the angle of arrival of the signal, by using a correction value corresponding to the determined data range from among correction values stored in a memory of the electronic device and respectively corresponding to the plurality of data ranges.

According to various example embodiments, the calculation of AoA within a specified error and/or with a specified accuracy in a specified angle range with respect to an angle between antennas and an external electronic device may be supported, and accordingly reliability for positioning of the external electronic device may be increased.

In addition to this, various effects identified directly or indirectly through the present document may be provided.

BRIEF DESCRIPTION OF DRAWINGS

The above and other aspects, features and advantages of certain embodiments will be more apparent from the following detailed description, taken in conjunction with the accompanying drawings, in which.

In connection with the description of the drawings, the same or similar reference numerals may be used for the same or similar elements.

DETAILED DESCRIPTION

Figure 1:
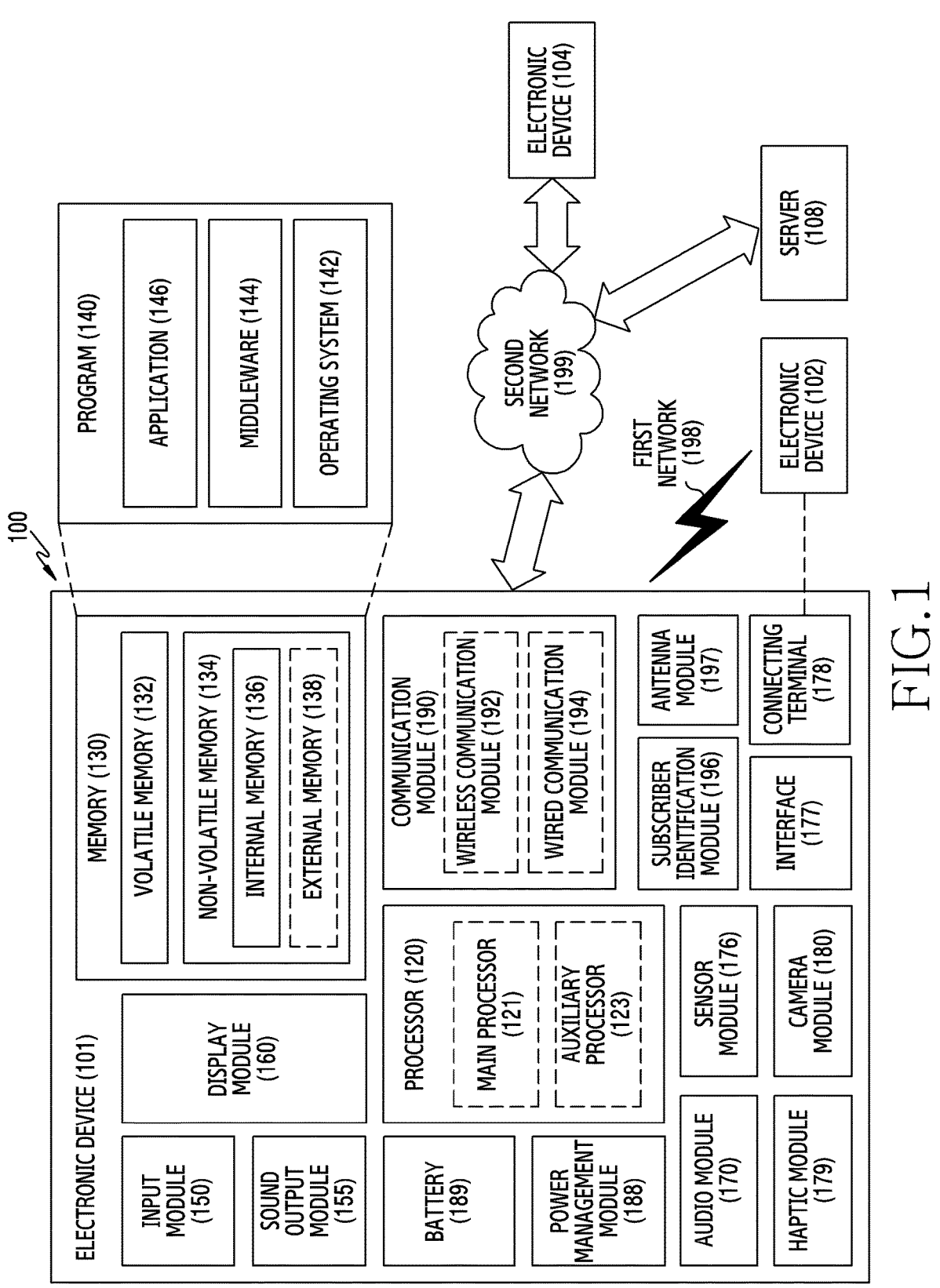
FIG. 1 is a block diagram of an electronic device in a network environment according to various example embodiments.

Hereinafter, various example embodiments will be described with reference to the accompanying drawings. For convenience of description, the size of the components shown in the drawings may be exaggerated or reduced, and the scope is not necessarily limited by the drawings.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190, comprising communication circuitry, may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module, comprising communication circuitry) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
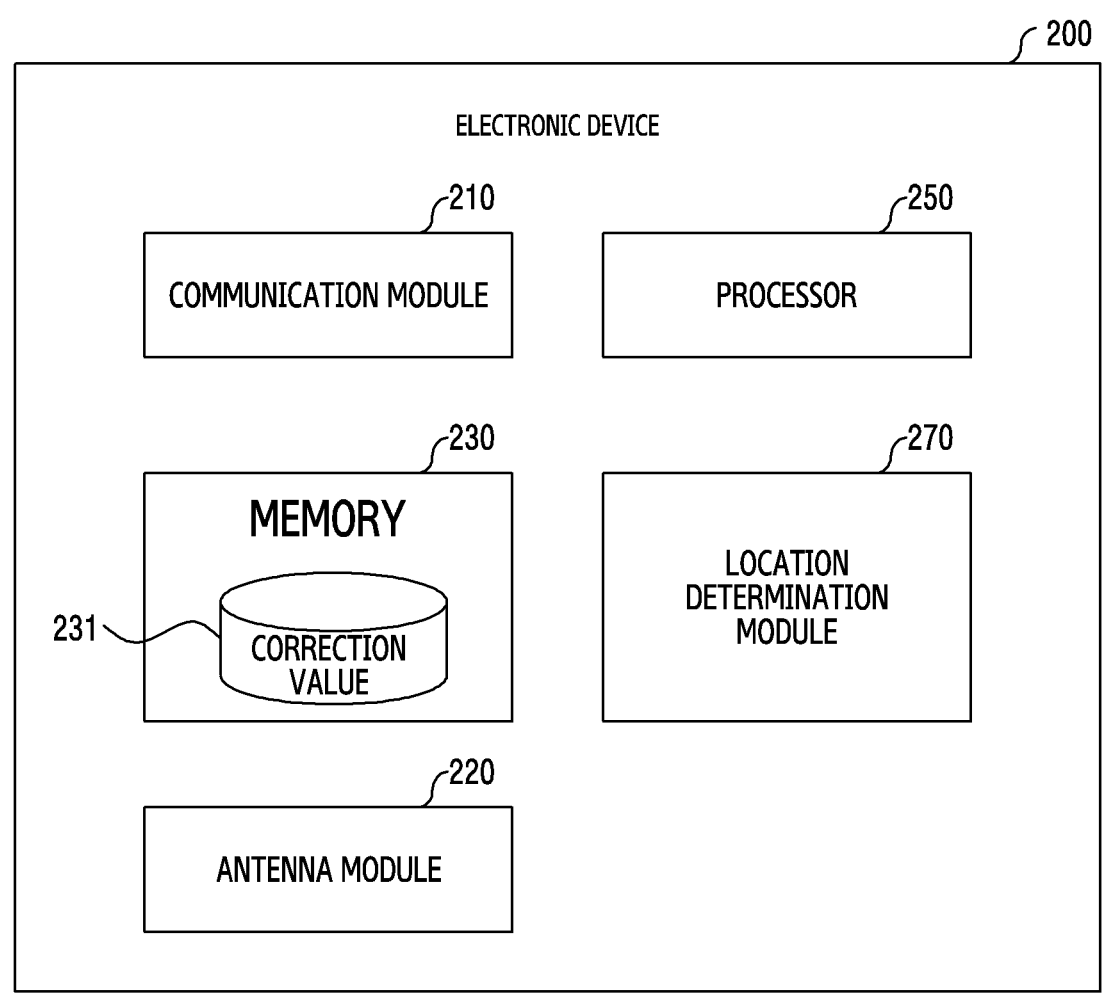
FIG. 2 is a diagram for explaining a construction of an electronic device that provides a function of positioning using wireless communication according to an example embodiment.

FIG. 2 is a diagram for explaining a construction of an electronic device that provides a function of positioning using wireless communication according to an example embodiment.

The electronic device 200 (e.g., the electronic device 101 of FIG. 1) may provide a function of positioning using wireless communication. For example, the electronic device 200 may measure the location of an external electronic device (e.g., the electronic device 102 or the electronic device 104 of FIG. 1) through a ranging operation that uses UWB communication, and may control a function of the external electronic device or provide a specified location-based service to the external electronic device, based on the measured location of the external electronic device. Here, the UWB communication may indicate short-distance high-speed wireless communication that uses a wide frequency band, a low spectral density, and a short pulse width in a baseband state. For example, the frequency band of the UWB communication may include a 3 GHz band (e.g., about 3.735 GHz to 4.8 GHz), a 6 GHz band (e.g., about 6.0 GHz to 7.2 GHz), and/or a 7 GHz band (e.g., about 7.2 GHz to 10.2 GHz).

According to an embodiment, the electronic device 200 may determine the location of the external electronic device by using the angle of arrival (AoA) of a signal received from the external electronic device. Here, the angle of arrival may be calculated using a distance between antennas receiving a signal and a phase difference of arrival (PDoA) of the signal received at each of the antennas. The relationship between the angles of arrival, the distance between the antennas, and the phase difference of arrival of the signal may be defined by equations described later.

According to an embodiment, the electronic device 200 may calibrate an error of a calculated value of the angle of arrival. In a calibration process, the electronic device 200 may apply different correction values respectively corresponding to a plurality of angle ranges divided according to a specified condition with respect to an angle between the antennas and the external electronic device, thereby providing a value within a specified error and/or with a specified accuracy for the calculated value of the angle of arrival. Here, a method for setting the correction value corresponding to each of the plurality of angle ranges will be described in detail with reference to FIG. 4 and FIG. 5 described later.

Referring to FIG. 2, the electronic device 200 for supporting the above-mentioned function may include a communication module 210 (e.g., the communication module 190 of FIG. 1), an antenna module 220 (e.g., the antenna module 197 of FIG. 1), a memory 230 (e.g., the memory 130 of FIG. 1), a processor 250 (e.g., the processor 120 of FIG. 1), and a location determination module 270. However, the construction of the electronic device 200 is not limited thereto. According to various embodiments, the electronic device 200 may further include at least one other component in addition to the above-described components. Each processor herein comprises processing circuitry, and each "module" herein may comprise circuitry.

The communication module 210 may support communication between the electronic device 200 and the external electronic device. For example, the communication module 210 may establish wireless communication (e.g., UWB communication) with the external electronic device according to a specified communication protocol, and may transmit and/or receive signals or data by using a frequency band supported by the wireless communication. The communication module 210 may support the establishment of a UWB communication channel (or a UWB session) corresponding to a frequency band (e.g., a 3 GHz band (e.g., about 3.735 GHz to 4.8 GHz), a 6 GHz band (e.g., about 6.0 GHz to 7.2 GHz), and/or a 7 GHz band (e.g., about 7.2 GHz to 10.2 GHz)) specified to be used for UWB communication, from among bands to be used for wireless communication with the external electronic device (e.g., the external electronic device 102 of FIG. 1). The communication module 210 may support UWB communication with the external electronic device through the UWB communication channel. When transmitting, the communication module 210 may convert a baseband signal generated by the processor 250 (e.g., an application processor and/or a communication processor) into an RF signal of a UWB band, and transmit the same to the outside through the antenna module 220 (e.g., a UWB antenna). When receiving, the communication module 210 may acquire an RF signal of a UWB band through the antenna module 220 (e.g., the UWB antenna), convert the acquired RF signal into a baseband signal, and transmit the same to the processor 250.

The antenna module 220 may transmit and/or receive signals or data with the external electronic device. According to an embodiment, the antenna module 220 may include a plurality of antennas, and at least one antenna suitable for a communication scheme used in a short-range communication network or long-range communication network from among the plurality of antennas may be selected and operated by the communication module 210 (or the processor 250). According to an embodiment, the antenna module 220 may include at least one or more RF signal transmission antennas and at least one or more RF signal reception antennas. For another example, the antenna module 220 may include at least one or more antennas for transmitting and/or receiving an RF signal. According to an embodiment, the antenna module 220, comprising at least one antenna, may receive a UWB signal (e.g., an RF signal of a UWB band) from the external electronic device or transmit the UWB signal to the external electronic device.

The memory 230 may store various data used by at least one component of the electronic device 200. According to an embodiment, the memory 230 may store an application supporting a service that uses the communication module 210. According to an embodiment, the memory 230 may store data or instructions used by a process or application program executed by the processor 250.

According to an embodiment, the memory 230 may store correction values 231 respectively corresponding to a plurality of data ranges divided according to a specified condition, in relation to data for positioning of the external electronic device. The correction value 231 may include at least one of a first correction value applied to a first value indicating a distance between antennas, and a second correction value applied to a second value indicating a phase difference of arrival of the signal received at each of the antennas, from among values used to calculate the angle of arrival of a signal received through the antennas. According to an embodiment, the data may include the phase difference of arrival of the signal, and the plurality of data ranges may be divided according to the magnitude of the phase difference of arrival of the signal. According to another embodiment, the data may include the angle of arrival calculated based on the signal, and the plurality of data ranges may be divided according to the magnitude of the angle of arrival. In the following description, the plurality of data ranges may be referred to as segments. For example, the correction values 231 respectively corresponding to a plurality of segments may be stored in the memory 230.

According to an embodiment, at least one of the correction values 231 stored in the memory 230 may be updated (or changed). In an example, the correction value 231 may be changed based on an error generated during actual use of the electronic device 200. In another example, the correction value 231 may be changed based on a value received from the external electronic device. Here, the external electronic device may be a server (e.g., the server 108 of FIG. 1) that manages correction values used in a plurality of devices, and the external electronic device may collect errors generated during actual use of the plurality of devices, may change a correction value, based on the collected information, and may transmit the changed correction value to the electronic device 200.

According to an embodiment, the specified condition for dividing the plurality of segments may include a condition in which a change rate of the data dependent on an angle between the antennas receiving the signal and the external electronic device is changed by a specified amount or more. A method of dividing the plurality of segments according to the specified condition will be described in detail with reference to FIG. 7A and FIG. 7B described later.

The processor 250, comprising processing circuitry, may control at least one other component of the electronic device 200, and may perform various data processing or operations. According to an embodiment, the processor 250 may execute instructions for controlling operations of the communication module 210 and/or the location determination module 270. In some embodiment, the processor 250 may perform at least one of the operations of the communication module 210 and/or the location determination module 270 as well. Thus, the processor may make up at least part of the location determination module 270 in certain example embodiments.

The location determination module 270, comprising processing circuitry, may perform a function of positioning the external electronic device. The location determination module 270 may acquire a phase difference of arrival of a signal, which is calculated based on the signal received from the external electronic device via the communication module 210 (comprising communication circuitry). Also, the location determination module 270 may determine a data range corresponding to the acquired phase difference of arrival of the signal from among a plurality of data ranges that are set in relation to the correction values 231 stored in the memory 230. Also, the location determination module 270 may calculate the angle of arrival of the signal by using the correction value 231 corresponding to the determined data range from among the correction values 231, and determine the location of the external electronic device by using the calculated angle of arrival. According to an embodiment, the location determination module 270 may be understood as a hardware module (e.g., circuitry), but is not limited thereto. For example, the location determination module 270 may include a software structure in addition to or alternatively to a hardware structure. According to an embodiment, the location determination module 270 may be implemented as software (e.g., the program 140 of FIG. 1) that includes one or more instructions stored in a component included in the processor 250 or a storage medium (e.g., the memory 230) readable by the processor 250. According to an embodiment, the operations performed by the location determination module 270 may be executed by instructions stored in the memory 230 and enabling the processor 250 to operate when executed.

According to an embodiment, when the data related to the correction value 231 stored in the memory 230 includes the phase difference of arrival of the signal, the location determination module 270 may determine a data range (e.g., segment) corresponding to the acquired phase difference of arrival of the signal from among the plurality of data ranges (e.g., segments divided by the magnitude of the phase difference of arrival of the signal).

According to an embodiment, when the data related to the correction value 231 stored in the memory 230 includes the angle of arrival of the signal, the location determination module 270 may determine a data range (e.g., segment) corresponding to the acquired phase difference of arrival of the signal from among the plurality of data ranges (e.g., segments divided by the magnitude of the angle of arrival of the signal). In this case, after calculating the angle of arrival of the signal by using the acquired phase difference of arrival of the signal, the location determination module 270 may determine a data range (e.g., segment) corresponding to the calculated angle of arrival of the signal from among the plurality of data ranges.

According to an embodiment, when the data range (e.g., segment) is determined, the location determination module 270 may calculate the angle of arrival of the signal by using the correction value 231 corresponding to the data range (e.g., segment) from among the correction values 231 stored in the memory 230. For example, when the data is divided into N segments and the determined segment is a k-th segment, the location determination module 270 may apply a first correction value corresponding to the k-th segment to a first value indicating a distance between the antennas, and apply a second correction value corresponding to the k-th segment to a second value indicating the phase difference of arrival of the signal received at each of the antennas, from among values used to calculate the angle of arrival of the signal. That is, the first correction value from among the correction values 231 stored in the memory 230 may not indicate the actual distance between the antennas receiving the signal, and may be a value applied to the first value indicating the distance between the antennas from among the parameters of an equation used when calculating the angle of arrival of the signal. Also, the second correction value from among the correction values 231 stored in the memory 230 may be an offset applied to the phase difference of arrival of the signal received at each of the antennas, and the offset may be a value applied (e.g., summed or determined) to the second value indicating the phase difference of arrival of the signal from among the parameters of an equation used when calculating the angle of arrival of the signal. In other words, in a location relationship between the electronic device 200 and the external electronic device, the correction value 231 (e.g., the first correction value and the second correction value) may include values for calculating a value within a specified error and/or with a specified accuracy for the angle of arrival of the signal received from the external electronic device.

According to an embodiment, at least one of the correction values 231 may be set based on at least one of a combination of antennas receiving a signal, a frequency channel receiving the signal, and the orientation of the electronic device 200. In an example, the correction value 231 applied to the angle of arrival calculated based on a signal received through a first antenna and a second antenna from among antennas included in the communication module 210 may be different from the correction value 231 applied to the angle of arrival calculated based on a signal received through the first antenna and a third antenna from among the antennas included in the communication module 210. In another example, the correction value 231 applied when the frequency channel receiving the signal is a first channel (e.g., channel 5) may be different from the correction value 231 applied when the frequency channel receiving the signal is a second channel (e.g., channel 9). In a further example, the correction value 231 when the electronic device 200 is in a landscape orientation (landscape mode) may be different from the correction value 231 when the electronic device 200 is in reverse landscape orientation (reverse landscape mode).

According to an embodiment, the correction value 231 may be set based on experimental values acquired through a plurality of experiments before or during the process of the electronic device 200. A method of setting the first correction value and the second correction value corresponding to each of the plurality of segments will be described in detail with reference to FIG. 3 to FIG. 5 described later.

According to an embodiment, the location determination module 270 may apply a matching value for matching when an angle between antennas receiving a signal and the external electronic device is a reference angle (e.g., 0 degree), to the calculated angle of arrival of the signal. The matching value may include a value for correcting an error of the angle of arrival that may occur due to signal interference dependent on a distance between the antennas receiving the signal, process deviation, or measurement error dependent on an angle between the antennas and the external electronic device. According to an embodiment, the matching value may be acquired during a process of the electronic device 200, and may be stored in the memory 230 together with the correction value 231. According to another embodiment, the matching value may be summed with at least one of the correction values 231 and be stored in the memory 230. According to an embodiment, at least one of the correction values 231 and the matching value may be stored in a secure world of the electronic device 200. The secure world may include, for example, a secure world (e.g., a trusted execution environment (TEE)) of the processor 250 or secure hardware physically separated from the processor 250.

According to an embodiment, the location determination module 270 may be included in the communication module 210 and/or the processor 250. For example, at least some of the operations of the location determination module 270 may be performed by the communication module 210 and/or the processor 250.

As described above, according to various embodiments, an electronic device (e.g., the electronic device 200 of FIG. 2) may include a communication module (e.g., the communication module 210 of FIG. 2) that supports ultra-wideband communication, a memory (e.g., the memory 230 of FIG. 2) that stores correction values (e.g., the correction values 231 of FIG. 2) respectively corresponding to a plurality of data ranges divided according to a specified condition, in relation to data for positioning of an external electronic device, a processor (e.g., the processor 250 of FIG. 2) operatively connected to the communication module and the memory, and a location determination module (e.g., the location determination module 270 of FIG. 2) operatively connected to the processor. The location determination module may be configured to acquire a phase difference of arrival of a signal calculated based on the signal received from the external electronic device via the communication module, determine a data range corresponding to the acquired phase difference of arrival of the signal from among the plurality of data ranges, and calculate the angle of arrival of the signal by using a correction value corresponding to the determined data range from among the correction values.

According to various embodiments, the correction value may include at least one of a first correction value applied to a first value indicating a distance between antennas receiving the signal, and a second correction value applied to a second value indicating a phase difference of arrival of the signal received at each of the antennas, from among values used to calculate the angle of arrival of the signal.

According to various embodiments, the data may include the phase difference of arrival of the signal received from the external electronic device via the communication module, and the plurality of data ranges may be divided according to the magnitude of the phase difference of arrival of the signal.

According to various embodiments, the data may include the angle of arrival of the signal calculated based on the signal received from the external electronic device via the communication module, and the plurality of data ranges may be divided according to the magnitude of the angle of arrival of the signal.

According to various embodiments, the specified condition may include a condition in which a change rate of the data dependent on an angle between antennas receiving the signal and the external electronic device is changed by a specified amount or more.

According to various embodiments, the location determination module may be configured to apply, to the angle of arrival of the signal, a matching value for matching when an angle between antennas receiving the signal and the external electronic device is a reference angle.

According to various embodiments, at least one of the correction values may be summed and stored with the matching value.

According to various embodiments, at least one of the correction values and the matching value may be stored in a secure world of the electronic device.

According to various embodiments, at least one of the correction values may be set based on at least one of a combination of antennas receiving the signal, a frequency channel receiving the signal, and the orientation of the electronic device.

According to various embodiments, the location determination module may be included in the communication module or the processor.

Figure 3:
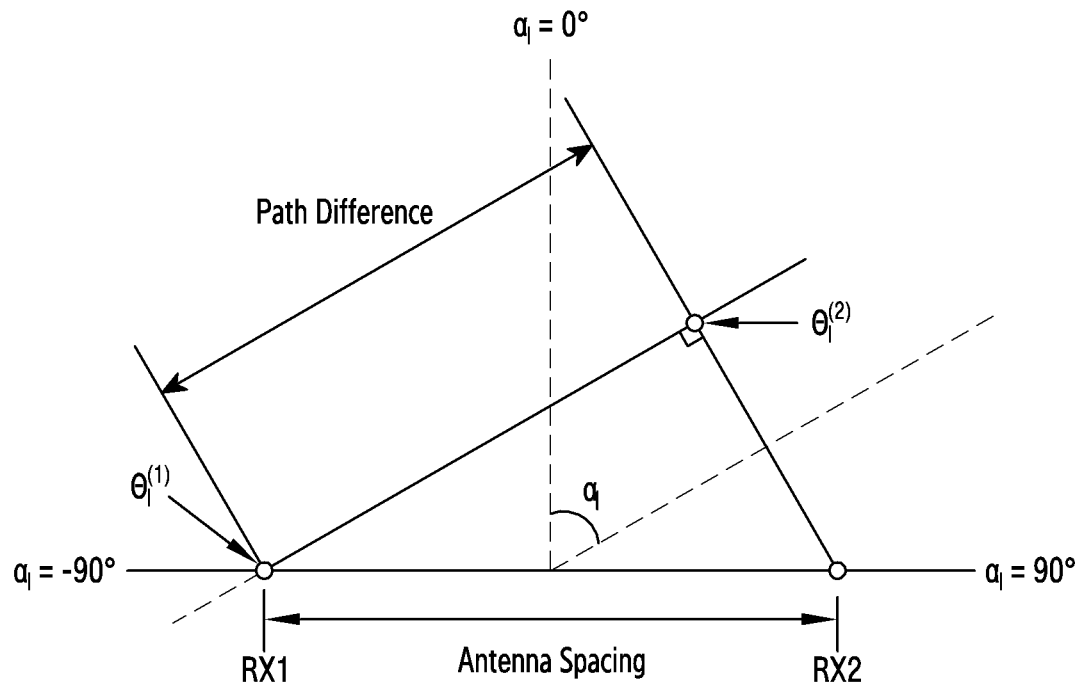
FIG. 3 is a diagram for explaining a method for calculating the angle of arrival of a signal by using a distance between antennas and a phase difference of arrival of the signal received at each of the antennas according to an example embodiment.

FIG. 3 is a diagram for explaining a method of calculating the angle of arrival of a signal by using a distance between antennas and a phase difference of arrival of the signal received at each of the antennas according to an example embodiment.

Referring to FIG. 3, a location determination module (e.g., the location determination module 270 of FIG. 2) of an electronic device (e.g., the electronic device 200 of FIG. 2) may receive a signal from an external electronic device through each of a plurality of antennas (e.g., RX1 and RX2 of FIG. 3) included in a communication module (e.g., the communication module 210 of FIG. 2). The location determination module may calculate a phase difference of arrival of the signal received through each of the antennas. When the distance (e.g., antenna spacing in FIG. 3) between the antennas is defined by Equation 1 below, the phase difference of arrival of the signal may be calculated by Equation 2 below.

$$d = \frac{\beta\lambda}{2} \qquad \text{[Equation 1]}$$

Here, d may denote a distance between antennas, $\lambda$ may denote a wavelength of the signal, and $\beta$ may denote a normalization factor.

$$\Delta\theta_l = \theta_l^{(2)} - \theta_l^{(1)} = \pi\beta\sin\alpha_l$$

Here, $\Delta\theta_l$ may denote a phase difference of arrival of the signal, $$\theta_l^{(1)}$$

and $$\theta_l^{(2)}$$

may denote phases of signals received by a first antenna and a second antenna, respectively, and $\alpha_l$ may denote the angle of arrival of the signal.

When the above-described Equation 2 is generalized by applying the offset for the phase difference of arrival of the signal, the following Equation 3 may be derived.

$$s\Delta\theta - \Delta\phi = \pi\beta\sin\alpha \qquad \text{[Equation 3]}$$

Here, s is a value indicating the presence or absence of a phase flip and may have a value of 1 when the phase flip is possible and a value of −1 when not possible, $\Delta\theta$ may denote the phase difference of arrival of the signal, $\Delta\phi$ may denote the offset for the phase difference of arrival of the signal, and α may denote the angle of arrival of the signal. Also, in the above-described Equation 3, when the calculated value of $\Delta\theta - \Delta\varphi$ is out of the range of $-\pi\beta$ to $\pi\beta$, it may be wrapped and converted to be within the range of $-\pi\beta$ to $\pi\beta$.

As in Equation 3 above, the angle of arrival of the signal may be calculated by the distance (d) between the antennas, which may be set based on β, and the phase difference (Δθ) of the signal (and/or the offset (Δφ) for the phase difference of arrival). When the above-described Equation 3 is applied to a plurality of angles of arrival, the following Equation 4 may be used.

$$\Delta\theta'_{kn} - \Delta\varphi = \pi\beta \sin\alpha_k \qquad \text{[Equation 4]}$$

Here, k may denote a natural number in the range of 1 to K, and n may denote a natural number in the range of 1 to N, and denote a state assumed to be when the phase flip is possible (s=1).

Based on the above Equation 4, the following Equation 5 may be derived.

$$\begin{bmatrix} \pi\sin\alpha_k & 1 \end{bmatrix}\begin{bmatrix} \beta \\ \Delta\varphi \end{bmatrix} = \Delta\theta'_{kn} \qquad \text{[Equation 5]}$$

Also, when least square is applied to the above-described Equation 5, the following Equation 6 may be derived.

$$\hat{X} = \begin{bmatrix} \beta \\ \Delta\varphi \end{bmatrix} = (A^T A)^{-1} A^T b \qquad \text{[Equation 6]}$$

Here, A may denote a matrix of size KN×2 having [π sin $\alpha_k$ 1] as one row, and b may denote a matrix of size KN×1 having $$[\Delta\theta'_{kn}]$$

as one row.

Based on the above-described Equation 6, a correction value (e.g., the correction values 231 of FIG. 2) within a specified error and/or with a specified accuracy for calculating the angle of arrival of the signal may be acquired based on experimental values acquired through a plurality of experiments before or during the process of the electronic device. The correction values may be acquired, for example, through Equation 6 described above, and may include a first correction value applied to a first value indicating a distance (d) between the antennas from among parameters used to calculate the angle of arrival, and a second correction value (e.g., the offset (Δφ) for the phase difference of arrival of the signal) applied to a second value indicating the phase difference (Δθ) of arrival of the signal. According to an embodiment, the above-described experimental values may be acquired by setting the distance between the antennas to about 20 mm (β is about 0.866) and setting the offset for the phase difference of arrival of the signal to 0. According to an embodiment, the operation of acquiring the correction value may be performed through a module (e.g., an artificial intelligence module) specialized in processing an artificial intelligence model.

Figure 4A:
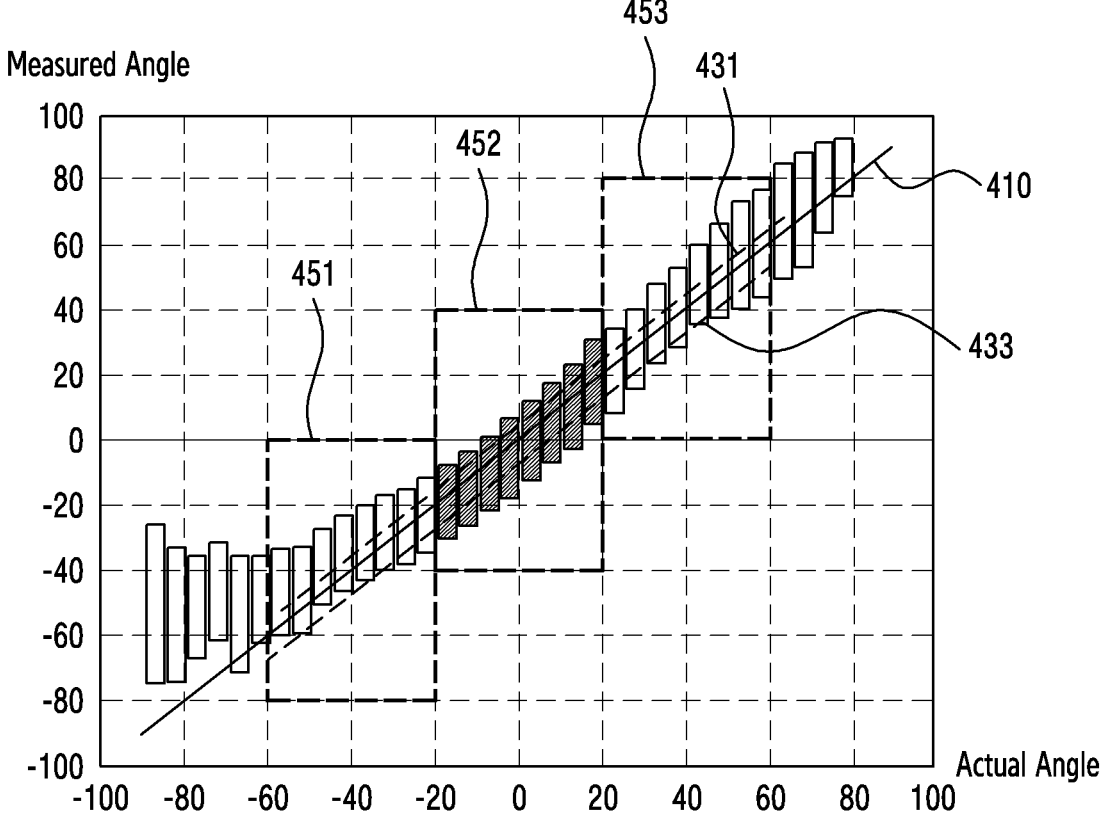
FIG. 4A is a diagram illustrating the angle of arrival of a signal when a distance between antennas and an offset for a phase difference of arrival of the signal are a first condition according to an example embodiment.
Figure 4B:
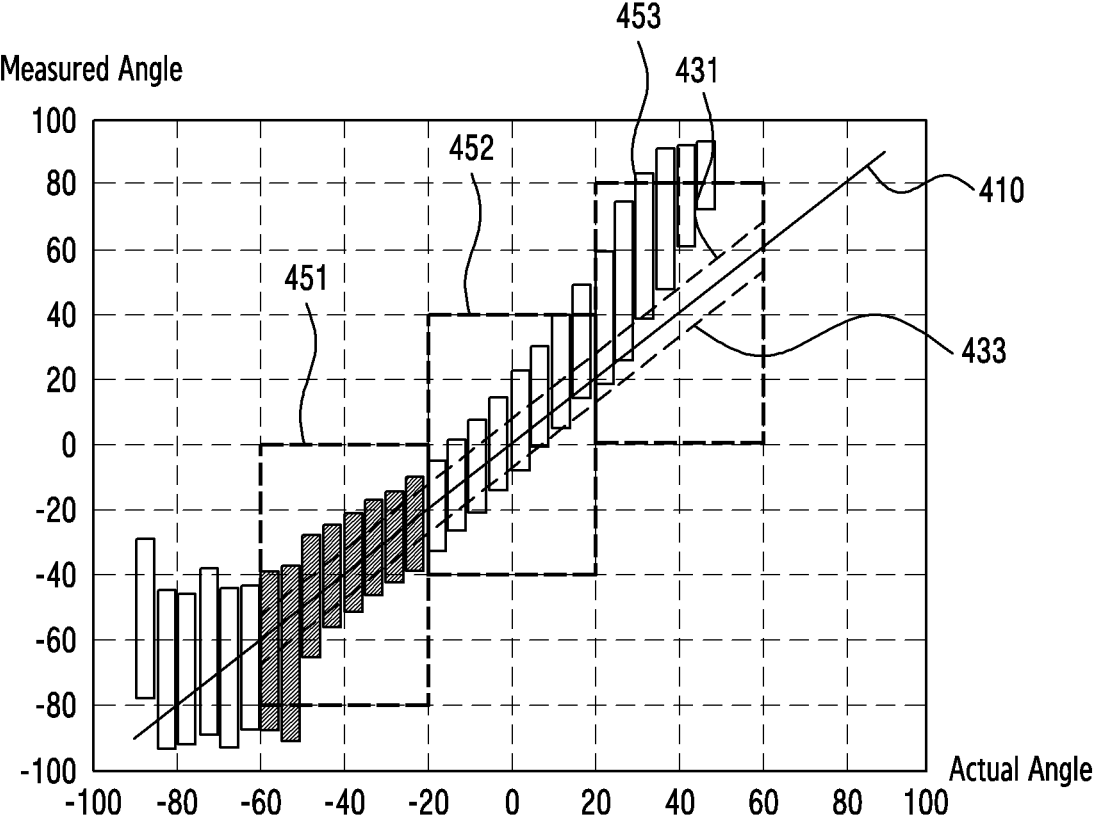
FIG. 4B is a diagram illustrating the angle of arrival of a signal when a distance between antennas and an offset for a phase difference of arrival of the signal are a second condition according to an example embodiment.
Figure 4C:
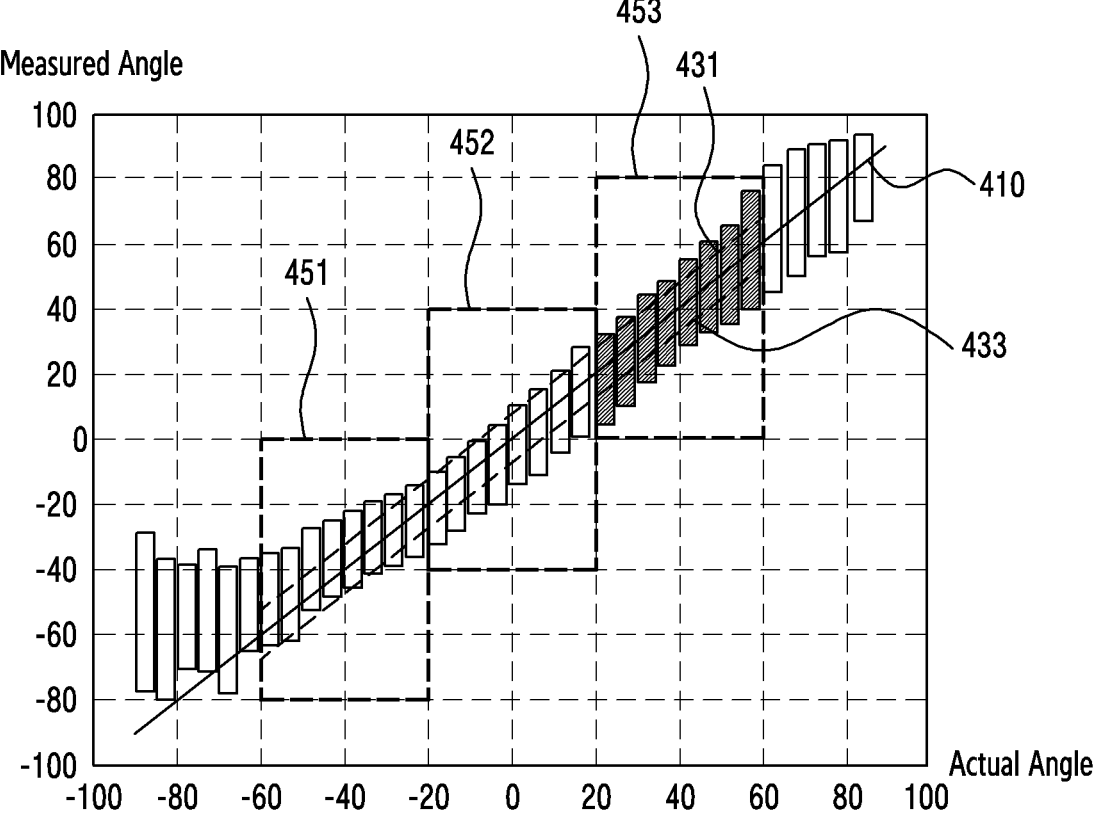
FIG. 4C is a diagram illustrating the angle of arrival of a signal when a distance between antennas and an offset for a phase difference of arrival of the signal are a third condition according to an example embodiment.

FIG. 4A is a diagram illustrating the angle of arrival of a signal when a distance between antennas and an offset for a phase difference of arrival of the signal are a first condition according to an example embodiment, and FIG. 4B is a diagram illustrating the angle of arrival of a signal when a distance between the antennas and an offset for a phase difference of arrival of the signal are a second condition according to an example embodiment, and FIG. 4C is a diagram illustrating the angle of arrival of a signal when a distance between the antennas and an offset for a phase difference of arrival of the signal are a third condition according to an example embodiment.

Referring to FIG. 4A to FIG. 4C, when the angle of arrival is calculated through the above-described Equations of FIG. 3, an error may occur in the angle of arrival measured depending on an actual angle between an electronic device (e.g., the electronic device 200 of FIG. 2) (or the antennas included in the electronic device) and an external electronic device. In an example, as shown in FIG. 4A, when the actual angle between the electronic device and the external electronic device is within a second angle range 452 (e.g., −20 degrees to 20 degrees), a first value indicating a distance between antennas from among parameters used to calculate the angle of arrival within a specified error and/or with a specified accuracy, and a second value (or an offset applied to a phase difference of arrival) indicating a phase difference of arrival of a signal received at each of the antennas, may satisfy a first condition (e.g., the distance between the antennas is 15.7677 mm and the offset for the phase difference is −146.3402 degrees). However, under the first condition, when the actual angle between the electronic device and the external electronic device is within a first angle range 451 (e.g., −60 degrees to −20 degrees), an error may occur in the measured angle (e.g., the angle of arrival). For example, the angle of arrival measured in the first angle range 451 may be calculated as values deviating from straight lines 431 and 433 indicating a specified error range, based on a straight line 410 indicating the angle of arrival within a specified error and/or with a specified accuracy dependent on the actual angle between the electronic device and the external electronic device.

In another example, as shown in FIG. 4B, when the actual angle between the electronic device and the external electronic device is within the first angle range 451, a first value indicating a distance between antennas from among parameters used to calculate the angle of arrival within a specified error and/or with a specified accuracy, and a second value (or an offset applied to a phase difference of arrival) indicating a phase difference of arrival of a signal received at each of the antennas, may satisfy a second condition (e.g., the distance between the antennas is 11.6551 mm and the offset for the phase difference is −158.0888 degrees). However, under the second condition, when the actual angle between the electronic device and the external electronic device is within a third angle range 453 (e.g., 20 degrees to 60 degrees), an error may occur in the measured angle (e.g., the angle of arrival). For example, the angle of arrival measured in the third angle range 453 may be calculated as values deviating from the straight lines 431 and 433 indicating the specified error range, based on the straight line 410 indicating the angle of arrival within the specified error and/or with the specified accuracy dependent on the actual angle between the electronic device and the external electronic device.

In a further example, as shown in FIG. 4C, when the actual angle between the electronic device and the external electronic device is within the third angle range 453, a first value indicating a distance between antennas from among parameters used to calculate the angle of arrival within a specified error and/or with a specified accuracy, and a second value (or an offset applied to a phase difference of arrival) indicating a phase difference of arrival of a signal received at each of the antennas, may satisfy a third condition (e.g., the distance between the antennas is 15.9637 mm, and the offset for the phase difference is −139.4839 degrees). However, under the third condition, when the actual angle between the electronic device and the external electronic device is within the first angle range 451, an error may occur in the measured angle (e.g., the angle of arrival). For example, the angle of arrival measured in the first angle range 451 may be calculated as values deviating from the straight lines 431 and 433 indicating the specified error range, based on the straight line 410 indicating the angle of arrival within the specified error and/or with the specified accuracy dependent on the actual angle between the electronic device and the external electronic device.

According to an embodiment, the operation of calculating a first value indicating a distance between antennas from among parameters which are used to calculate the angle of arrival within a specified error and/or with a specified accuracy, based on a value (e.g., PDoA) measured depending on an actual angle between the electronic device and the external electronic device or a value (e.g., AoA) calculated through the measured value, and a second value indicating a phase difference of arrival of a signal received at each of the antennas (or the offset applied to the phase difference of arrival), may be performed through an artificial intelligence module. For example, the artificial intelligence module may calculate the first value and the second value as output values, by using the measured value or the calculated value as an input value.

Figure 5:
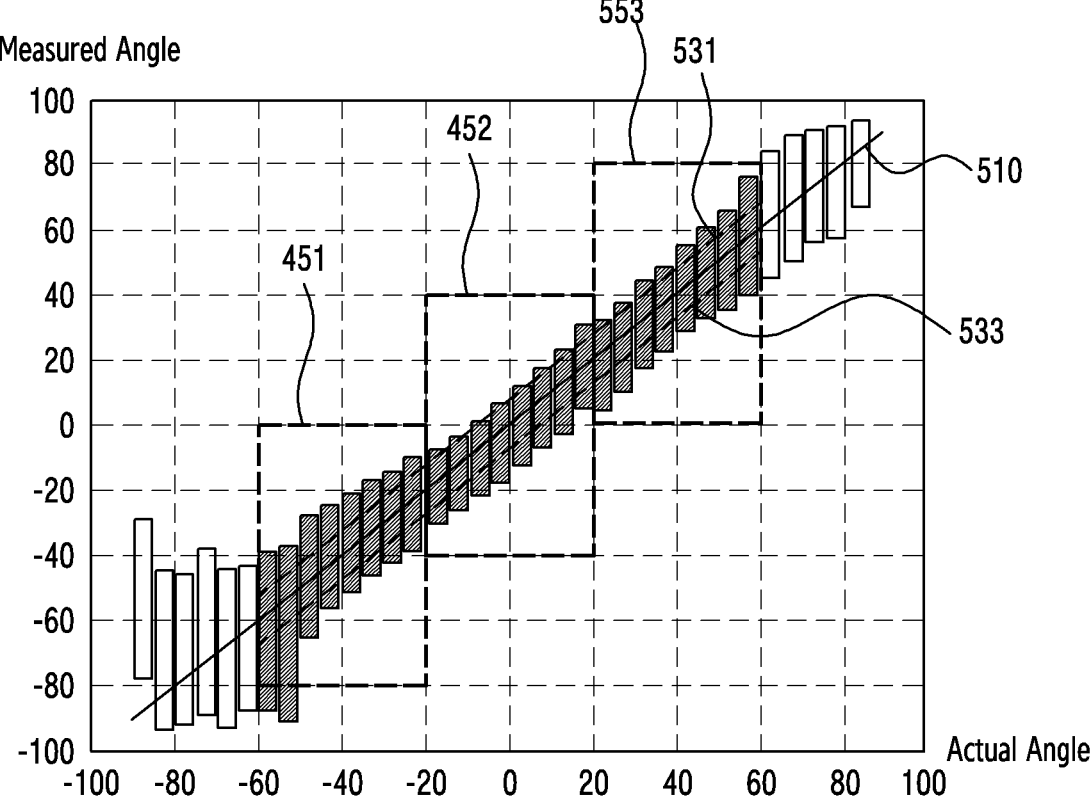
FIG. 5 is a diagram illustrating the angle of arrival of a signal calculated by applying different correction values respectively corresponding to a plurality of angle ranges divided according to a specified condition with respect to an angle between antennas and an external electronic device according to an example embodiment.

FIG. 5 is a diagram illustrating the angle of arrival of a signal calculated by applying different correction values respectively corresponding to a plurality of angle ranges divided according to a specified condition with respect to an angle between antennas and an external electronic device according to an example embodiment.

Because an error may occur in the angle of arrival measured according to an actual angle between an electronic device (e.g., the electronic device 200 of FIG. 2) (or antennas included in the electronic device) and an external electronic device as in FIG. 4A to FIG. 4C described above, the electronic device (e.g., of or including the location determination module 270 of FIG. 2) may divide the angle between the antennas and the external electronic device into the plurality of angle ranges, and may calculate the angle of arrival by using the different correction values (e.g., the correction value 231 of FIG. 2) respectively corresponding to the divided plurality of angle ranges.

Referring to FIG. 5, when the angle between the electronic device and the external electronic device is within a second angle range 552 (e.g., −20 degrees to 20 degrees), the electronic device may calculate the angle of arrival by using a correction value that satisfies a first condition (e.g., a distance between the antennas is 15.7677 mm and an offset for a phase difference is −146.3402 degrees) as in FIG. 4A, and when the angle between the electronic device and the external electronic device is within a first angle range 551 (e.g., −60 degrees to −20 degrees), the electronic device may calculate the angle of arrival by using a correction value that satisfies a second condition (e.g., the distance between the antennas is 11.6551 mm and the offset for the phase difference is −158.0888 degrees) as in FIG. 4B, and when the angle between the electronic device and the external electronic device is within a third angle range 553 (e.g., 20 degrees to 60 degrees), the electronic device may calculate the angle of arrival by using a correction value that satisfies a third condition (e.g., the distance between the antennas is 15.9637 mm and the offset for the phase difference is −139.4839 degrees) as in FIG. 4C. Accordingly, the electronic device may apply different correction values respectively corresponding to a plurality of angle ranges divided according to a specified condition with respect to the angle between the electronic device (or the antennas) and the external electronic device, thereby supporting wherein the angle of arrival calculated in the specified angle range (e.g., −60 degrees to 60 degrees) is calculated as values not deviating from straight lines 531 and 533 indicating a specified error range, based on a straight line 510 indicating the angle of arrival within a specified error and/or with a specified accuracy dependent on the actual angle between the electronic device and the external electronic device.

In the above description, the angle ranges may be referred to as segments. For example, the first angle range 551, the second angle range 552, and the third angle range 553 may be referred to as a first segment, a second segment, and a third segment, respectively.

The correction value corresponding to each of the plurality of segments may be stored in a memory (e.g., the memory 230 of FIG. 2). In an example, the correction value may be stored in the memory in the form of a table as shown in Table 1 or Table 2 below. Table 1 shows the case where segments are divided based on the angle range of the angle of arrival (AoA) of the signal, and Table 2 shows the case where the segments are divided based on the angle range of the phase difference (PDoA) of the signal.

TABLE 1

| segment | angle range (AoA) | distance between antennas | offset for phase difference of arrival of signal |
|---|---|---|---|
| 1 | −60° to −20° | 11.6551 mm | −158° |
| 2 | −20° to 20° | 15.7677 mm | −146° |
| 3 | 20° to 60° | 15.9637 mm | −139° |

TABLE 2

| segment | angle range (PDoA) | distance between antennas | offset for phase difference of arrival of signal |
|---|---|---|---|
| 1 | −180° to −50° | 11.6551 mm | −158° |
| 2 | −50° to 60° | 15.7677 mm | −146° |
| 3 | 60° to 180° | 15.9637 mm | −139° |

In the above description, the case where the segments are divided into three is shown, but an embodiment is not limited thereto. According to various embodiments, the segments may be divided into at least two or more. Also, in the above description, the case where the segments are divided based on the angle between the electronic device and the external electronic device is shown, but an embodiment is not limited thereto. According to various embodiments, the segments may be divided based on a phase difference of arrival of a signal received through antennas or the angle of arrival calculated based on the signal as well. A method of dividing the segments will be described in detail with reference to FIG. 7A and FIG. 7B described later.

Figure 6A:
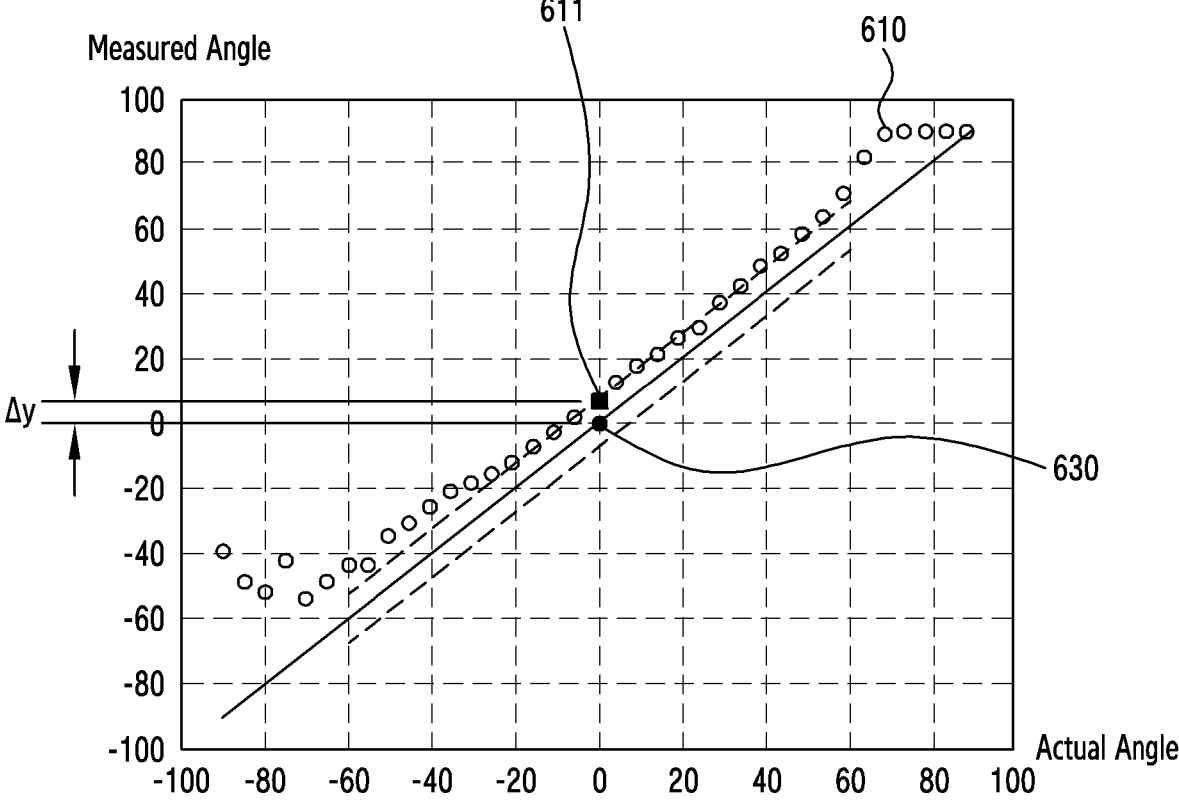
FIG. 6A is a diagram illustrating the angle of arrival of a signal before performing matching according to an example embodiment.
Figure 6B:
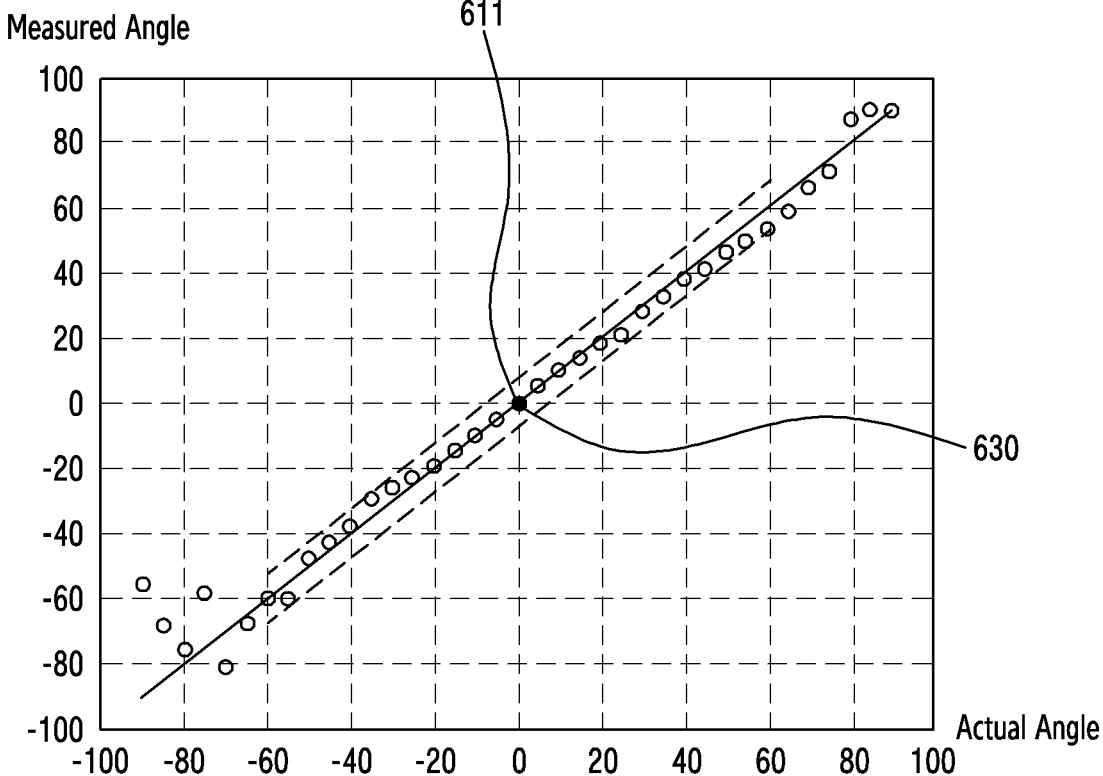
FIG. 6B is a diagram illustrating the angle of arrival of a signal after performing matching according to an example embodiment.

FIG. 6A is a diagram showing the angle of arrival of a signal before performing matching according to an example embodiment, and FIG. 6B is a diagram showing the angle of arrival of a signal after performing matching according to an example embodiment.

Referring to FIG. 6A and FIG. 6B, during a process, an electronic device (e.g., the electronic device 200 of FIG. 2) may perform a calibration procedure for correcting an error of the angle of arrival of a signal, which may occur due to signal interference dependent on a distance between antennas receiving the signal, process deviation, or measurement error dependent on an angle between the antennas and an external electronic device. For example, the electronic device (e.g., the location determination module 270 of FIG. 2) may apply a matching value (Δy) (e.g., 7.47 degrees) for matching when the angle between the antennas receiving the signal and the external electronic device is a reference angle (e.g., 0 degree), to the calculated angle of arrival of the signal. According to an embodiment, the electronic device may perform correction by applying a matching value wherein an angle value 611 when the angle between the antennas and the external electronic device is a reference angle from among angle (e.g., angle of arrival) values 610 measured based on the signal received through the antennas corresponds to an actual angle value 630 (e.g., 0 degree).

According to an embodiment, the matching value may be stored in a memory (e.g., the memory 230 of FIG. 2). In an example, the matching value may be stored in the memory in the form of a table. In another example, as shown in Table 3 or Table 4 below, the matching value may be summed and stored with at least one of the correction values of Table 1 or Table 2 described above. Here, the matching value may be converted into an offset for a phase difference of arrival of a signal and be summed.

TABLE 3

| segment | angle range (AoA) | distance between antennas | offset for phase difference of arrival of signal |
|---|---|---|---|
| 1 | −60° to −20° | 11.6551 mm | −158° + 20.1937° = −137.8063° |
| 2 | −20° to 20° | 15.7677 mm | −146° + 20.1937° = −125.8063° |
| 3 | 20° to 60° | 15.9637 mm | −139° + 20.1937° = −118.8063° |

TABLE 4

| segment | angle range (PDoA) | distance between antennas | offset for phase difference of arrival of signal |
|---|---|---|---|
| 1 | −180° to −50° | 11.6551 mm | −158° + 20.1937° = −137.8063° |
| 2 | −50° to 60° | 15.7677 mm | −146° + 20.1937° = −125.8063° |
| 3 | 60° to 180° | 15.9637 mm | −139° + 20.1937° = −118.8063° |

According to an embodiment, at least one of the matching value and the correction values may be stored in a secure world of the electronic device. The secure world may include, for example, a secure world of a processor (e.g., the processor 250 of FIG. 2) of the electronic device or a secure hardware physically separated from the processor. According to an embodiment, in applying different correction values respectively corresponding to a plurality of angle ranges divided according to a specified condition with respect to an angle between the electronic device (or the antennas) and the external electronic device, when the angle of arrival is not within a specified angle range (e.g., −60 degrees to 60 degrees), the electronic device may re-perform the measurement of the angle of arrival by requesting a user to change the orientation of the electronic device, or re-perform the measurement of the angle of arrival by using a different antenna combination from among two or more antenna combinations.

Figure 7A:
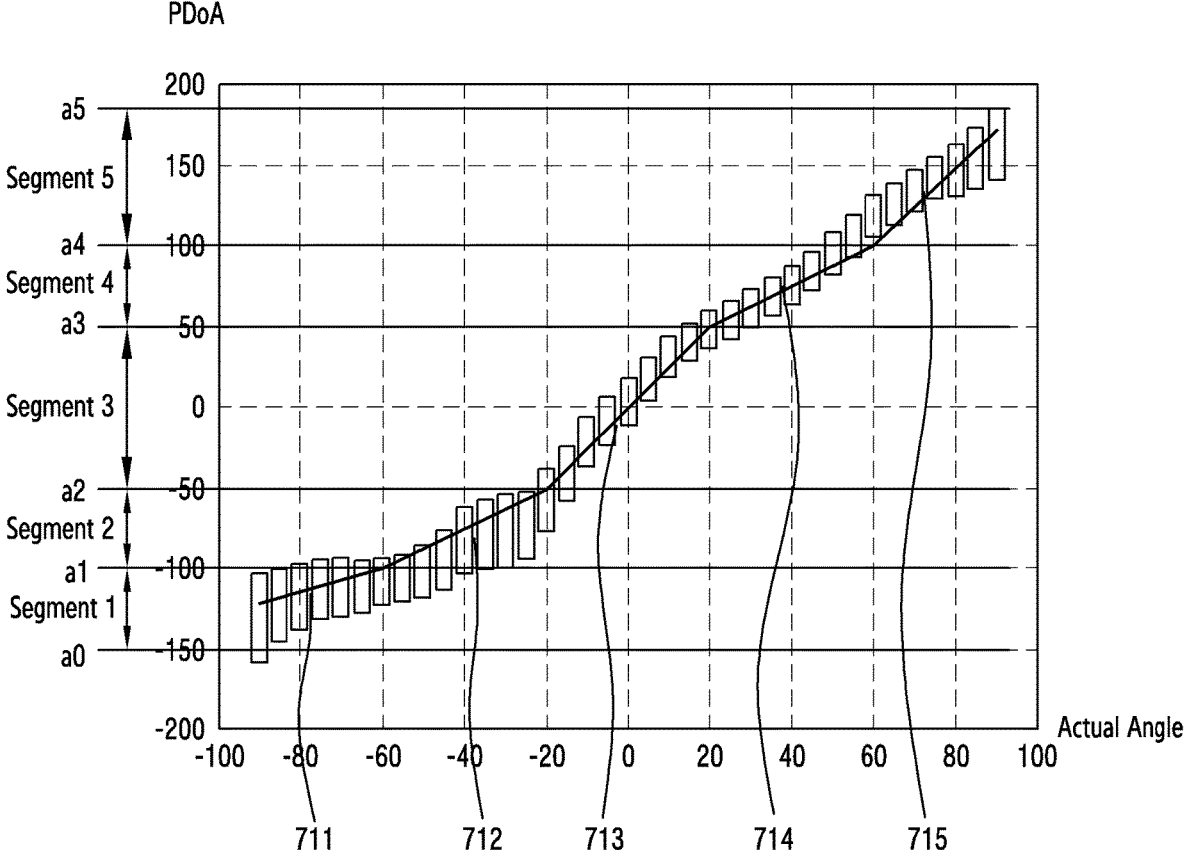
FIG. 7A is a diagram for explaining a method for dividing a plurality of angle ranges with respect to an angle between antennas and an external electronic device, based on a phase difference of arrival of a signal according to an example embodiment.
Figure 7B:
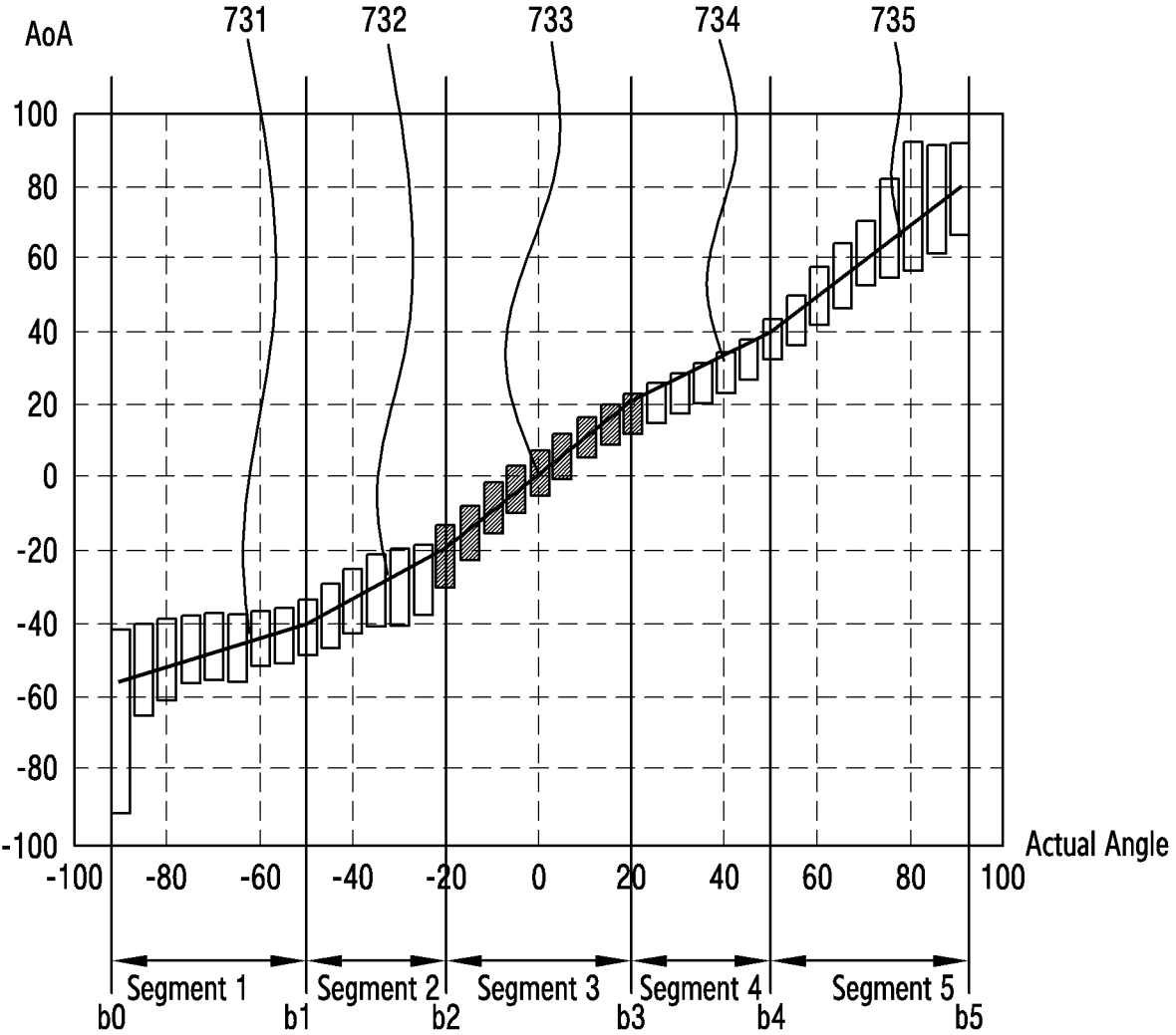
FIG. 7B is a diagram for explaining a method for dividing a plurality of angle ranges with respect to an angle between antennas and an external electronic device, based on the angle of arrival of a signal according to an example embodiment.

FIG. 7A is a diagram for explaining a method of dividing a plurality of angle ranges with respect to an angle between antennas and an external electronic device, based on a phase difference of arrival of a signal according to an example embodiment, and FIG. 7B is a diagram for explaining a method of dividing a plurality of angle ranges with respect to an angle between antennas and an external electronic device, based on the angle of arrival of a signal according to an example embodiment.

Referring to FIG. 7A and FIG. 7B, a location determination module (e.g., the location determination module 270 of FIG. 2) of an electronic device (e.g., the electronic device 200 of FIG. 2) may store, in a memory (e.g., the memory 230 of FIG. 2), correction values (e.g., the correction values 231 of FIG. 2) respectively corresponding to a plurality of data ranges divided according to a specified condition, in relation to data for positioning of the external electronic device. Here, the data may include a phase difference of arrival of a signal received from the external electronic device via a communication module (e.g., the communication module 210 of FIG. 2), or the angle of arrival of the signal which is calculated based on the signal. For example, when the data includes the phase difference of arrival of the signal, the data ranges may be divided according to the magnitude of the phase difference of arrival of the signal, and when the data includes the angle of arrival of the signal, the data ranges may be divided according to the magnitude of the angle of arrival of the signal. Here, the data ranges (or angle ranges) may be referred to as segments. FIG. 7A shows the case where the segments are divided based on the phase difference of arrival of the signal, and FIG. 7B shows the case where the segments are divided based on the angle of arrival of the signal. Also, the specified condition for dividing the segments may include, for example, a condition in which a change rate of the data dependent on an actual angle between the antennas and the external electronic device is changed by a specified amount or more.

Referring to FIG. 7A, a line indicating a phase difference of arrival (PDoA) of an ideal signal dependent on an angle between the antennas and the external electronic device may be expressed as a straight line. For example, a change rate of a phase difference of arrival of a signal dependent on the angle between the antennas and the external electronic device may ideally have a predetermined value. However, when the change rate of the phase difference of arrival of the signal is determined as an actually measured phase difference of arrival of a signal, the change rate may be varied at some points depending on the angle between the antennas and the external electronic device. For example, the change rate of the measured phase difference of arrival of the signal dependent on the angle between the antennas and the external electronic device may be changed at some angles.

As shown in FIG. 7A, when the angle between the antennas and the external electronic device is within a first angle range (e.g., less than −60 degrees), the change rate of the phase difference of arrival of the signal may be expressed as a slope of a first straight line 711, and when the angle between the antennas and the external electronic device is in a second angle range (e.g., −60 degrees to −20 degrees), the change rate of the phase difference of arrival of the signal may be expressed as a slope of a second straight line 712, and when the angle between the antennas and the external electronic device is in a third angle range (e.g., −20 degrees to 20 degrees), the change rate of the phase difference of arrival of the signal may be expressed as a slope of a third straight line 713, and when the angle between the antennas and the external electronic device is in a fourth angle range (e.g., 20 degrees to 60 degrees), the change rate of the phase difference of arrival of the signal may be expressed as a slope of a fourth straight line 714, and when the angle between the antennas and the external electronic device is in a fifth angle range (e.g., 60 degrees or more), the change rate of the phase difference of arrival of the signal may be expressed as a slope of a fifth straight line 715. The slopes may be calculated by a distance between the antennas receiving the signal in an equation for calculating the angle of arrival of the signal by using the phase difference of arrival of the signal.

In this case, the location determination module may divide segments, based on a point at which the change rate of the phase difference of arrival of the signal is changed by a specified amount or more, that is, a point at which the slope of the straight line indicating the change rate of the phase difference of arrival of the signal is changed. For example, the location determination module may divide the segments, based on a first angle (e.g., an angle at a point where the first straight line 711 and the second straight line 712 intersect) (e.g., −60 degrees) at which the change rate of the phase difference of arrival of the signal is changed by a specified amount or more, a second angle (e.g., an angle at a point where the second straight line 712 and the third straight line 713 intersect) (e.g., −20 degrees), a third angle (e.g., an angle at a point at which the third straight line 713 and the fourth straight line 714 intersect) (e.g., 20 degrees), and a fourth angle (e.g., an angle at a point where the fourth straight line 714 and the fifth straight line 715 intersect) (e.g., 60 degrees). Accordingly, a first segment (segment 1) may be set from the lowest point (a0) of a phase difference of arrival of a signal to a phase difference of arrival (a1) of the signal corresponding to the first angle, and a second segment (segment 2) may be set from the phase difference of arrival (a1) of the signal corresponding to the first angle to a phase difference of arrival (a2) of the signal corresponding to the second angle, and a third segment (segment 3) may be set from the phase difference of arrival (a2) of the signal corresponding to the second angle to a phase difference of arrival (a3) of the signal corresponding to the third angle, and a fourth segment (segment 4) may be set from the phase difference of arrival (a3) of the signal corresponding to the third angle to a phase difference of arrival (a4) of the signal corresponding to the fourth angle, and a fifth segment (segment 5) may be set from the phase difference of arrival (a4) of the signal corresponding to the fourth angle to the highest point (a5) of the phase difference of arrival of the signal.

Referring to FIG. 7B, a line indicating the angle of arrival (AoA) of an ideal signal dependent on an angle between the antennas and the external electronic device may be expressed as a straight line. For example, a change rate of the angle of arrival of a signal dependent on the angle between the antennas and the external electronic device may ideally have a predetermined value. However, when the change rate of the angle of arrival of the signal is determined as a phase difference of arrival of a signal actually measured, the change rate may be varied at some points depending on the angle between the antennas and the external electronic device. For example, the change rate of the calculated angle of arrival of the signal dependent on the angle between the antennas and the external electronic device may be changed at some angles.

As shown in FIG. 7B, when the angle between the antennas and the external electronic device is in a first angle range (e.g., less than −50 degrees), the change rate of the angle of arrival of the signal may be expressed as a slope of a first straight line 731, and when the angle between the antennas and the external electronic device is in a second angle range (e.g., −50 degrees to −20 degrees), the change rate of the angle of arrival of the signal may be expressed as a slope of a second straight line 732, and when the angle between the antennas and the external electronic device is in a third angle range (e.g., −20 degrees to 20 degrees), the change rate of the angle of arrival of the signal may be expressed as a slope of a third straight line 733, and when the angle between the antennas and the external electronic device is in a fourth angle range (e.g., 20 degrees to 50 degrees), the change rate of the angle of arrival of the signal may be expressed as a slope of a fourth straight line 734, and when the angle between the antennas and the external electronic device is in a fifth angle range (e.g., 50 degrees or more), the change rate of the angle of arrival of the signal may be expressed as a slope of a fifth straight line 735.

In this case, the location determination module may divide segments, based on a point where the change rate of the angle of arrival of the signal is changed by a specified amount or more, that is, a point where a slope of the straight line indicating the change rate of the angle of arrival of the signal is changed. For example, the location determination module may divide the segments, based on a first angle (e.g., an angle at a point where the first straight line 731 and the second straight line 732 intersect) (e.g., −50 degrees) at which the change rate of the angle of arrival of the signal is changed by a specified amount or more, a second angle (e.g., an angle at a point where the second straight line 732 and the third straight line 733 intersect) (e.g., −20 degrees), a third angle (e.g., an angle at a point where the third straight line 733 and the fourth straight line 734 intersect) (e.g., 20 degrees), and a fourth angle (e.g., an angle at a point where the fourth straight line 734 and the fifth straight line 735 intersect) (e.g., 50 degrees). Accordingly, a first segment (segment 1) may be set from the lowest point (b0) (e.g., −90 degrees) of the angle of arrival of a signal to the angle of arrival (b1) of the signal corresponding to the first angle, and a second segment (segment 2) may be set from the angle of arrival (b1) of the signal corresponding to the first angle to the angle of arrival (b2) of the signal corresponding to the second angle, and a third segment (segment 3) may be set from the angle of arrival (b2) of the signal corresponding to the second angle to the angle of arrival (b3) of the signal corresponding to the third angle, and a fourth segment (segment 4) may be set from the angle of arrival (b3) of the signal corresponding to the third angle to the angle of arrival (b4) of the signal corresponding to the fourth angle, and a fifth segment (segment 5) may be set from the angle of arrival (b4) of the signal corresponding to the fourth angle to the highest point (b5) (e.g., 90 degrees) of the angle of arrival of the signal.

The above description shows the case where the segments are divided into 5, but an embodiment is not limited thereto. According to various embodiments, the segments may be divided into at least two or more.

Figure 8:
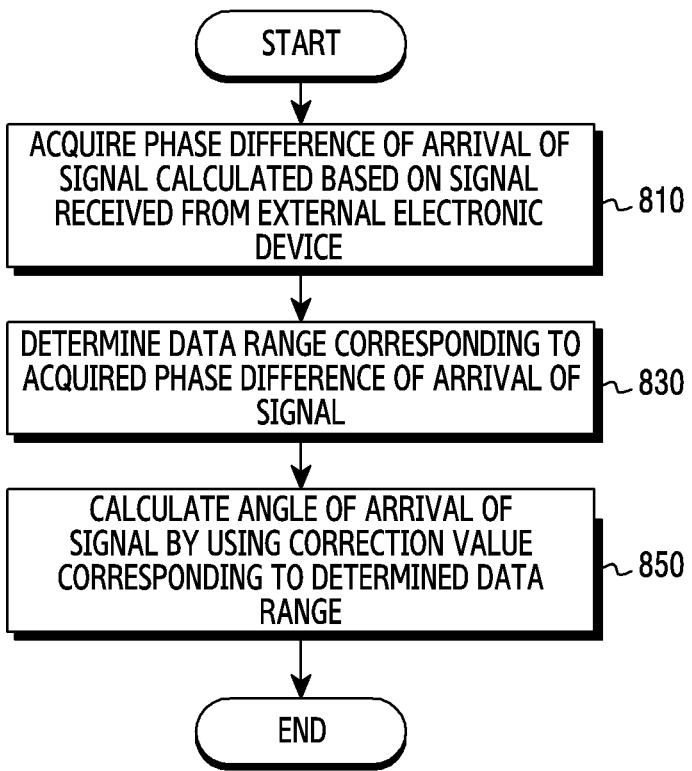
FIG. 8 is a diagram for explaining a method for positioning using wireless communication according to an example embodiment.

FIG. 8 is a diagram for explaining a method for positioning using wireless communication according to an example embodiment.

Referring to FIG. 8, in operation 810, a location determination module (e.g., the location determination module 270 of FIG. 2) of an electronic device (e.g., the electronic device 200 of FIG. 2) may acquire a phase difference of arrival of a signal calculated based on the signal received from an external electronic device via a communication module (e.g., the communication module 210 of FIG. 2) of the electronic device. For example, the signal received from the external electronic device may include a ranging signal (e.g., a positioning start message, a response message, and/or a final message) for measuring a distance to the external electronic device or a data signal.

In operation 830, the location determination module may determine a data range corresponding to the acquired phase difference of arrival of the signal from among a plurality of data ranges divided according to a specified condition, in relation to data for positioning of the external electronic device.

In this regard, a memory (e.g., the memory 230 of FIG. 2) of the electronic device may store correction values (e.g., the correction values 231 of FIG. 2) respectively corresponding to the plurality of data ranges divided according to the specified condition, in relation to the data for positioning of the external electronic device. The correction value may, for example, include at least one of a first correction value applied to a first value indicating a distance between antennas, and a second correction value applied to a second value indicating a phase difference of arrival of the signal received at each of the antennas, from among values used to calculate the angle of arrival (AoA) of a signal received through the antennas. According to an embodiment, the data may include a phase difference of arrival of the signal, and the plurality of data ranges may be divided according to the magnitude of the phase difference of arrival of the signal. According to another embodiment, the data may include the angle of arrival calculated based on the signal, and the plurality of data ranges may be divided according to the magnitude of the angle of arrival. Here, the plurality of data ranges may be referred to as segments. For example, correction values respectively corresponding to a plurality of segments may be stored in the memory. According to an embodiment, at least one of the correction values may be set based on at least one of a combination of antennas receiving a signal, a frequency channel receiving the signal, and the orientation of the electronic device.

According to an embodiment, the operation of calculating a first value indicating a distance between antennas, from among parameters which are used to calculate the angle of arrival within a specified error and/or with a specified accuracy, based on a value (e.g., PDoA) measured according to an actual angle between the electronic device and the external electronic device or a value (e.g., AoA) calculated through the measured value, and a second value (or an offset applied to a phase difference of arrival) indicating a phase difference of arrival of a signal received at each of the antennas, may be performed through an artificial intelligence module. For example, the artificial intelligence module may calculate the first value and the second value as output values, by using the measured value or the calculated value as an input value.

According to an embodiment, when the data related to the correction value stored in the memory includes the phase difference of arrival of the signal, the location determination module may determine a data range (e.g., segment) corresponding to the acquired phase difference of arrival of the signal from among the plurality of data ranges (e.g., segments divided by the magnitude of the phase difference of arrival of the signal). According to another embodiment, when the data related to the correction value stored in the memory includes the angle of arrival of the signal, the location determination module may determine a data range (e.g., segment) corresponding to the acquired phase difference of arrival of the signal from among the plurality of data ranges (e.g., segments divided by the magnitude of the angle of arrival of the signal). In this case, after calculating the angle of arrival of the signal by using the acquired phase difference of arrival of the signal, the location determination module may determine a data range (segment) corresponding to the calculated angle of arrival of the signal from among the plurality of data ranges.

When the data range is determined, in operation 850, the location determination module may calculate the angle of arrival of the signal, by using a correction value corresponding to the determined data range from among correction values stored in the memory and respectively corresponding to the plurality of data ranges. In an example, when the data range is divided according to the magnitude of the phase difference of arrival of the signal, the location determination module may calculate the angle of arrival of the signal, by using a correction value corresponding to a data range including the measured phase difference of arrival of the signal from among the plurality of data ranges. In another example, when the data range is divided according to the magnitude of the angle of arrival of the signal, the location determination module may calculate the angle of arrival of the signal by using the measured phase difference of arrival of the signal, and calculate the angle of arrival of the signal by using a correction value corresponding to a data range including the calculated angle of arrival of the signal from among the plurality of data ranges. That is, the measured phase difference of arrival of the signal or the angle of arrival of the signal calculated using the measured phase difference of arrival of the signal may be used to determine the data range, and after the data range is determined, the angle of arrival of the signal may be calculated using a correction value corresponding to the data range stored in the memory. In other words, the correction value corresponding to the data range stored in the memory may be used as a parameter applied to an equation for calculating the angle of arrival of the signal. Accordingly, the electronic device may calculate the angle of arrival within a specified error and/or with a specified accuracy in all of the plurality of data ranges.

According to an embodiment, in operation 850, the location determination module may apply a matching value for matching when an angle between an electronic device (or antennas) and an external electronic device is a reference angle (e.g., 0 degree), to the angle of arrival of the signal. For example, the location determination module may apply the matching value together with the correction value corresponding to the data range, in the process of calculating the angle of arrival of the signal.

According to an embodiment, the matching value may be stored in the memory. In an example, the matching value may be stored in the memory in the form of a table. In another example, the matching value may be summed and stored with at least one of the correction values. Here, the matching value may be converted into an offset for the phase difference of arrival of the signal and be summed.

According to an embodiment, at least one of the matching value and the correction values may be stored in a secure world of the electronic device. The secure world may include, for example, a secure world of a processor (e.g., the processor 250 of FIG. 2) of the electronic device or a secure hardware physically separated from the processor.

According to an embodiment, the electronic device may include two or more antennas, and may use a combination of two or more antennas for positioning with the external electronic device. For example, when the electronic device includes three antennas, the electronic device may use a combination of a first antenna and a second antenna, a combination of the second antenna and a third antenna, and/or a combination of the first antenna and the third antenna. According to an embodiment, the electronic device may store a plurality of matching values and/or correction values that are based on the antenna combinations, in the memory. For example, the electronic device may calculate the angle of arrival of a signal, by using a matching value and/or a correction value that are based on a combination of antennas receiving a signal from the external electronic device.

According to an embodiment, when the electronic device performs positioning with the external electronic device through a combination of two or more antennas, the electronic device may apply a weight to the matching value and/or the correction value, based on state information of the electronic device. For example, the electronic device may apply a weight to the matching value and/or the correction value, based on state information of the electronic device such as when the electronic device is in a landscape orientation (landscape mode) and in a portrait orientation (portrait mode) and when a display (e.g., the display module 160 of FIG. 1) of the electronic device faces the ground and faces opposite to the ground.

According to an embodiment, the electronic device may apply different matching values and/or correction values, based on a frequency band used for positioning with the external electronic device. For example, the electronic device may store a plurality of matching values and/or correction values in the memory in the form of a table, based on a plurality of frequency bands possible to perform positioning with the external electronic device.

According to an embodiment, the electronic device may receive information about matching values and/or correction values from a server (e.g., the server 108 of FIG. 1). For example, the electronic device may receive information about matching values and/or correction values that are based on a specified area or a specified time, from the server. For another example, the electronic device may receive information about matching values and/or correction values from the server, based on a HW change (e.g., upgrade) and/or a SW change (e.g., update) of the communication module (e.g., the communication module 210 of FIG. 2).

According to an embodiment, the electronic device may include a rollable or foldable display (e.g., the display module 160 of FIG. 1). The electronic device may apply different matching values and/or correction values, based on a state of the display (e.g., at least a portion is folded, unfolded, or at least a portion is rolled). For example, the electronic device may store a plurality of matching values and/or correction values that are based on the display state, in the memory in the form of a table. According to an embodiment, the electronic device may calculate the angle of arrival of a signal, by selectively using two or more antennas from among a plurality of antennas, based on the display state, or by selectively using a plurality of matching values and/or correction values.

As described above, according to various embodiments, a method for positioning using wireless communication of an electronic device (e.g., the electronic device 200 of FIG. 2) may include the operation of acquiring (operation 810 of FIG. 8) a phase difference of arrival of a signal calculated based on the signal received from an external electronic device via a communication module (e.g., the communication module 210 of FIG. 2) of the electronic device, the operation of determining (e.g., operation 830 of FIG. 8) a data range corresponding to the acquired phase difference of arrival of the signal from among a plurality of data ranges divided according to a specified condition, in relation to data for positioning of the external electronic device, and the operation of calculating (e.g., operation 850 of FIG. 8) the angle of arrival of the signal, by using a correction value corresponding to the determined data range from among correction values (e.g., the correction values 231 of FIG. 2) stored in a memory (e.g., the memory 230 of FIG. 2) of the electronic device and respectively corresponding to the plurality of data ranges.

According to various embodiments, the correction value may include at least one of a first correction value applied to a first value indicating a distance between antennas receiving the signal, and a second correction value applied to a second value indicating a phase difference of arrival of the signal received at each of the antennas, from among values used to calculate the angle of arrival of the signal.

According to various embodiments, the data may include the phase difference of arrival of the signal received from the external electronic device via the communication module, and the plurality of data ranges may be divided according to the magnitude of the phase difference of arrival of the signal.

According to various embodiments, the data may include the angle of arrival of the signal calculated based on the signal received from the external electronic device via the communication module, and the plurality of data ranges may be divided according to the magnitude of the angle of arrival of the signal.

According to various embodiments, the specified condition may include a condition in which a change rate of the data dependent on an angle between antennas receiving the signal and the external electronic device is changed by a specified amount or more.

According to various embodiments, the positioning method may further include the operation of applying, to the angle of arrival of the signal, a matching value for matching when an angle between antennas receiving the signal and the external electronic device is a reference angle.

According to various embodiments, at least one of the correction values may be summed and stored with the matching value.

According to various embodiments, at least one of the correction values and the matching value may be stored in a secure world of the electronic device.

According to various embodiments, at least one of the correction values may be set based on at least one of a combination of antennas receiving the signal, a frequency channel receiving the signal, and the orientation of the electronic device.

According to various embodiments, at least one of the operation of acquiring the phase difference of arrival of the signal, the operation of determining the data range, and the operation of calculating the angle of arrival of the signal may be performed by the communication module, or the processor (e.g., the processor 250 of FIG. 2) of the electronic device.

Figure 9:
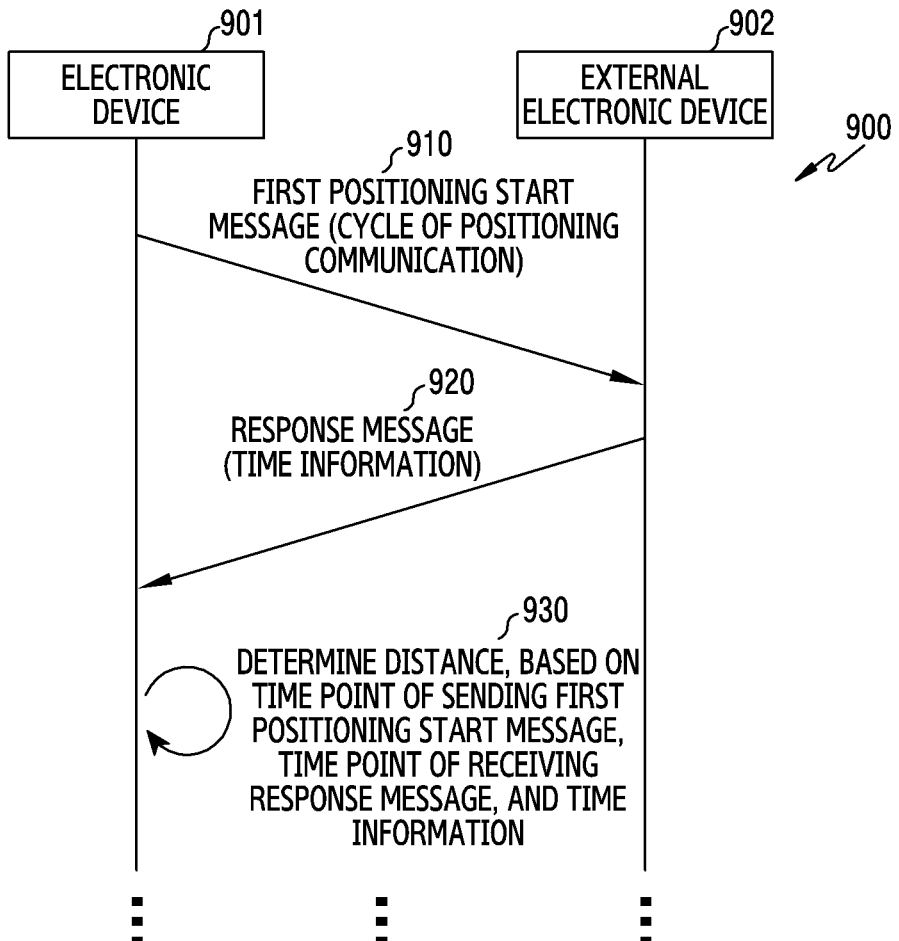
FIG. 9 is a diagram for explaining a method for positioning of a first scheme using wireless communication according to an example embodiment.

FIG. 9 is a diagram for explaining a method for positioning of a first scheme using wireless communication according to an example embodiment. FIG. 9 illustrates operations 900 in which an electronic device 901 (e.g., the electronic device 200 of FIG. 2) measures a distance by using single side-two way ranging (SS-TWR).

According to various embodiments, in operation 910, the electronic device 901 may transmit a positioning start message to an external electronic device 902 through a wireless communication channel (e.g., a UWB communication channel) established using a communication module (e.g., the communication module 210 of FIG. 2) (e.g., a UWB communication module). The electronic device 901 may include information indicating a cycle of positioning communication in the positioning start message and transmit the same to the external electronic device 902. For example, the information related to the cycle may be included in a payload of the positioning start message and be transmitted.

According to various embodiments, in operation 920, the electronic device 901 may receive a response message to the positioning start message from the external electronic device 902 through the wireless communication channel by using the communication module. The external electronic device 902 may include time information (e.g., a time value) indicating a time taken for the external electronic device 902 to process the positioning start message (e.g., to generate the response message), in the response message, and transmit the same to the electronic device 901. After transmitting the response message, the external electronic device 902 may operate in a sleep state for a specified sleep time (e.g., for a time equal to the cycle of positioning communication). For example, in the sleep state, the external electronic device 902 may stop the operation of receiving a signal from an external electronic device (e.g., the electronic device 901) through a wireless communication module (e.g., a wireless communication circuit supporting wireless communication through the established wireless communication channel, for example, a UWB communication circuit). During the sleep time after receiving the response message, the electronic device 901 may also operate in a sleep state of not transmitting a signal to the external electronic device (e.g., the external electronic device 902) through the wireless communication circuit supporting the wireless communication through the established wireless communication channel.

According to various embodiments, in operation 930, the electronic device 901 may determine a distance between the electronic device 901 and the external electronic device 902, based on a time point of sending the positioning start message, a time point of receiving the response message, and the time information. For example, a location determination module (e.g., the location determination module 270 of FIG. 2) (or a communication module or processor) of the electronic device 901 may determine a required time from when the positioning start message is transmitted from the electronic device 901 to when it reaches the external electronic device 902, from the time point of sending the positioning start message, the time point of receiving the response message, and the time information, and may acquire a distance by multiplying the determined required time by the speed of light.

Figure 10:
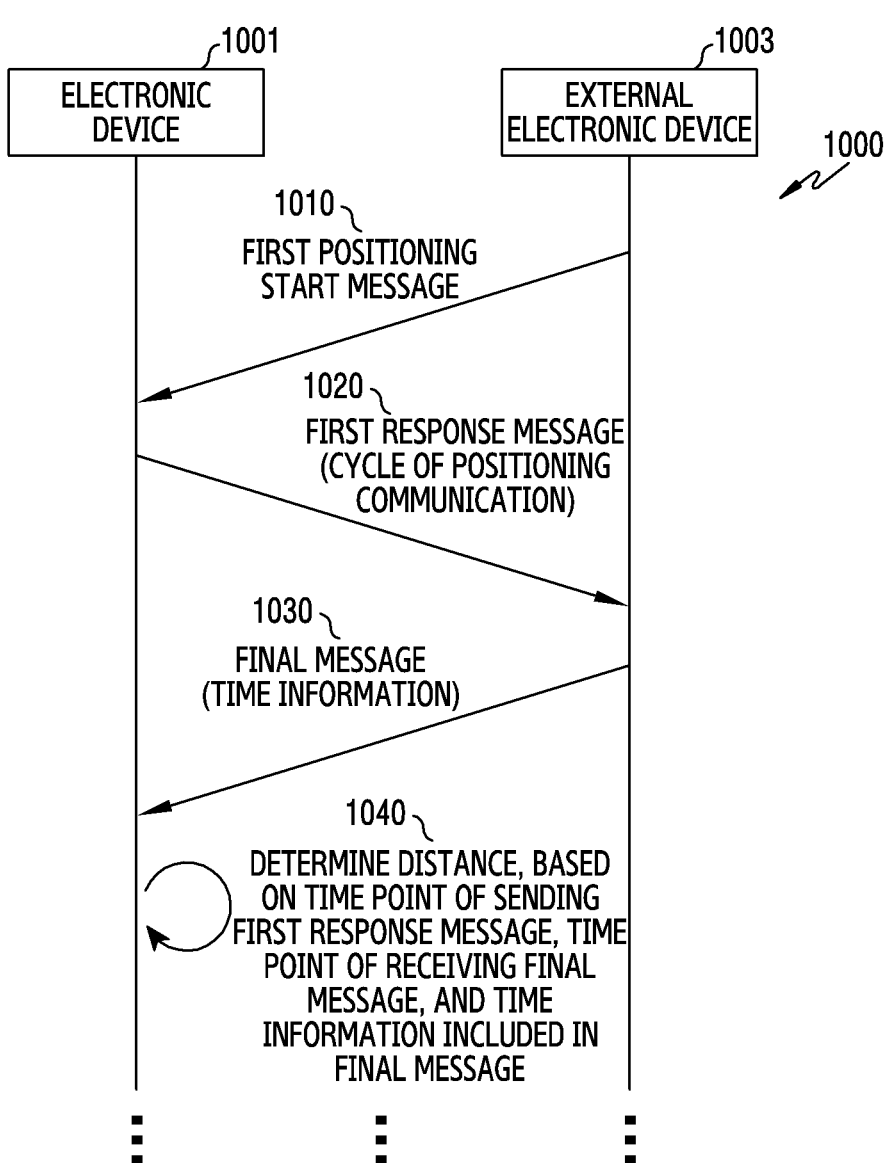
FIG. 10 is a diagram for explaining a method for positioning of a second scheme using wireless communication according to an example embodiment.

FIG. 10 is a diagram for explaining a method for positioning of a second scheme using wireless communication according to an example embodiment. FIG. 10 illustrates operations 1000 in which an electronic device 1001 (e.g., the electronic device 200 of FIG. 2) measures a distance by using double side-two way ranging (DS-TWR).

According to various embodiments, in operation 1010, the electronic device 1001 may receive a positioning start message from an external electronic device 1003 through a wireless communication channel (e.g., a UWB communication channel) established using a communication module (e.g., the communication module 210 of FIG. 2) (e.g., a UWB communication module). In an embodiment, the electronic device 1001 may determine to start positioning prior to operation 1010. In an example, the electronic device 1001 may establish the wireless communication channel for positioning communication with the external electronic device 1003 and then transmit a message of informing the start of positioning to the external electronic device 1003. In response to receiving the message, the external electronic device 1003 may transmit the positioning start message to the electronic device 1001.

According to various embodiments, in operation 1020, the electronic device 1001 may transmit a response message including information indicating the cycle of positioning communication to the external electronic device 1003, through the wireless communication channel established using the communication module.

According to various embodiments, in operation 1030, the electronic device 1001 may receive a final message of positioning communication from the external electronic device 1003 through the wireless communication channel established using the wireless communication module. The external electronic device 1003 may include time information (e.g., a time value) indicating the time taken for the external electronic device 1003 to process the response message (e.g., to generate the final message), in the final message, and transmit the same to the electronic device 1001. The external electronic device 1003 may operate in a sleep state for a specified sleep time (e.g., for a time equal to the cycle of positioning communication) after transmitting the final message. For example, in the sleep state, the external electronic device 1003 may stop of the operation of transmitting and/or receiving signals with an external electronic device (e.g., the electronic device 1001) through a wireless communication circuit supporting wireless communication through the established wireless communication channel. During the sleep time after receiving the final message, the electronic device 1001 may also operate in a sleep state of not transmitting and/or receiving signals with an external electronic device (e.g., the external electronic device 1003) through a wireless communication circuit (e.g., a UWB communication module) supporting wireless communication through the established wireless communication channel.

According to various embodiments, in operation 1040, a location determination module (e.g., the location determination module 270 of FIG. 2) (or the communication module or processor) of the electronic device 1001 may determine a distance between the electronic device 1001 and the external electronic device 1003, based on a time point of sending the response message, a time point of receiving the final message, and the time information. For example, the location determination module (or the communication module or processor) may determine a required time from when the response message is transmitted from the electronic device 1001 to when it reaches the external electronic device 1003, from the time point of sending the response message, the time point of receiving the final message, and the time information, and calculate a distance by multiplying the determined required time by the speed of light.

According to various embodiments, the electronic device 200 may measure a distance to the external electronic device through the method shown in FIG. 9 or FIG. 10, and may measure orientation with the external electronic device, based on the angle of arrival of a signal received from the external electronic device and a correction value.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a communication module, comprising communication circuitry, that supports ultra-wideband communication;
memory storing instructions and correction values respectively corresponding to a plurality of data ranges, in relation to data for positioning of an external electronic device, wherein the data ranges are divided based on a change rate of a phase difference of arrival (PDoA) with respect to an angle between antennas and an external electronic device;
at least one processor; and
a location determination module, comprising processing circuitry, operatively connected to the at least one processor, wherein at least part of the location determination module may optionally be part of the at least one processor;
wherein the instructions, when executed individually or collectively by the at least one processor, cause the electronic device to:
acquire a phase difference of arrival of a signal calculated based on the signal received from the external electronic device via the communication module;
determine a data range corresponding to the acquired phase difference of arrival of the signal from among the plurality of data ranges; and calculate an angle of arrival of the signal at least by using a correction value corresponding to the determined data range from among the correction values.

2. The electronic device of claim 1, wherein the correction value comprises at least one of a first correction value applied to a first value indicating a distance between antennas receiving the signal, and a second correction value applied to a second value indicating a phase difference of arrival of the signal received at each of the antennas, from among values used to calculate the angle of arrival of the signal.

3. The electronic device of claim 1, wherein the data comprises the phase difference of arrival of the signal received from the external electronic device via the communication module, and the plurality of data ranges are to be divided based on a magnitude of the phase difference of arrival of the signal.

4. The electronic device of claim 1, wherein the data comprises the angle of arrival of the signal based on the signal received from the external electronic device via the communication module, and the plurality of data ranges are to be divided based on a magnitude of the angle of arrival of the signal.

5. The electronic device of claim 1, wherein the plurality of data ranges are divided based on a specified condition in which a change rate of the data dependent on an angle between antennas receiving the signal and the external electronic device is changed by a specified amount or more.

6. The electronic device of claim 1, wherein the location determination module is configured to apply, to the angle of arrival of the signal, a matching value for matching when an angle between antennas receiving the signal and the external electronic device is a reference angle.

7. The electronic device of claim 6, wherein the location determination module is configured so that at least one of the correction values is to be summed and stored with the matching value.

8. The electronic device of claim 6, wherein at least one of the correction values and the matching value is stored in a secure world of the electronic device.

9. The electronic device of claim 1, wherein at least one of the correction values is set based on at least one of: a combination of antennas receiving the signal, a frequency channel receiving the signal, and orientation of the electronic device.

10. The electronic device of claim 1, wherein the at least one processor includes at least part of the location determination module.

11. A method for positioning using wireless communication of an electronic device, the method comprising:

acquiring a phase difference of arrival of a signal calculated based on the signal received from an external electronic device;

determining a data range corresponding to the acquired phase difference of arrival of the signal from among a plurality of data ranges, in relation to data for positioning of the external electronic device, wherein the data ranges are divided based on a change rate of the phase difference of arrival (PDoA) with respect to an angle between antennas and an external electronic device; and calculating an angle of arrival of the signal, at least by using a correction value corresponding to the determined data range from among correction values stored in a memory of the electronic device and respectively corresponding to the plurality of data ranges.

12. The method for positioning using wireless communication of claim 11, wherein the correction value comprises at least one of a first correction value applied to a first value indicating a distance between antennas receiving the signal, and a second correction value applied to a second value indicating a phase difference of arrival of the signal received at each of the antennas, from among values used to calculate the angle of arrival of the signal.

13. The method for positioning using wireless communication of claim 11, wherein the plurality of data ranges are divided based on a specified condition in which a change rate of the data dependent on an angle between antennas receiving the signal and the external electronic device is changed by a specified amount or more.

14. The method for positioning using wireless communication of claim 11, further comprising applying, to the angle of arrival of the signal, a matching value for matching when an angle between antennas receiving the signal and the external electronic device is a reference angle.

15. The method for positioning using wireless communication of claim 14, wherein at least one of the correction values is summed and stored with the matching value.

16. The method for positioning using wireless communication of claim 11, wherein at least one of the correction values is set based on at least one of: a combination of antennas receiving the signal, a frequency channel receiving the signal, and orientation of the electronic device.

17. The method for positioning using wireless communication of claim 11, wherein the data comprises the phase difference of arrival of the signal received from the external electronic device, and the plurality of data ranges are to be divided based on a magnitude of the phase difference of arrival of the signal.

18. The method for positioning using wireless communication of claim 11, wherein the data comprises the angle of arrival of the signal based on the signal received from the external electronic device, and the plurality of data ranges are to be divided based on a magnitude of the angle of arrival of the signal.

19. The method for positioning using wireless communication of claim 14, wherein at least one of the correction values and the matching value is stored in a secure world of the electronic device.

* * * * *